(12) United States Patent
Sarferaz

(10) Patent No.: US 11,741,393 B2
(45) Date of Patent: Aug. 29, 2023

(54) MACHINE LEARNING LIFECYCLE MANAGEMENT

(71) Applicant: SAP SE, Walldorf (DE)

(72) Inventor: Siar Sarferaz, Heidelberg (DE)

(73) Assignee: SAP SE, Walldorf (DE)

(*) Notice: Subject to any disclaimer, the term of this patent is extended or adjusted under 35 U.S.C. 154(b) by 749 days.

(21) Appl. No.: 16/782,775

(22) Filed: Feb. 5, 2020

(65) Prior Publication Data

US 2021/0241170 A1 Aug. 5, 2021

(51) Int. Cl.
*G06N 20/00* (2019.01)
*G06F 9/54* (2006.01)
*G06F 16/185* (2019.01)
*G06N 20/20* (2019.01)

(52) U.S. Cl.
CPC ............... *G06N 20/00* (2019.01); *G06F 9/54* (2013.01); *G06F 16/185* (2019.01); *G06N 20/20* (2019.01)

(58) Field of Classification Search
CPC .......... G06N 20/00; G06N 20/20; G06F 9/54; G06F 16/185
USPC .......................................................... 706/12
See application file for complete search history.

(56) References Cited

U.S. PATENT DOCUMENTS

| | | | |
|---|---|---|---|
| 2014/0040286 A1 | 2/2014 | Bane et al. | |
| 2016/0055222 A1* | 2/2016 | Sarferaz | G06F 16/28 707/603 |
| 2017/0006135 A1* | 1/2017 | Siebel | G06Q 10/06 |
| 2017/0039525 A1* | 2/2017 | Seidle | G06Q 10/1053 |
| 2018/0157987 A1* | 6/2018 | Schmidt-Karaca | G06Q 10/0637 |
| 2018/0165599 A1* | 6/2018 | Pete | G06N 5/02 |
| 2018/0174164 A1* | 6/2018 | B | G06N 5/025 |
| 2018/0332082 A1 | 11/2018 | Baumgart et al. | |
| 2019/0228261 A1 | 7/2019 | Chan | |
| 2020/0081916 A1* | 3/2020 | McShane | G06N 20/00 |
| 2020/0159690 A1 | 5/2020 | J et al. | |
| 2020/0311595 A1* | 10/2020 | Chen | G06N 5/02 |
| 2020/0401931 A1 | 12/2020 | Duan et al. | |
| 2021/0097444 A1* | 4/2021 | Bansal | G06F 9/546 |
| 2021/0133612 A1 | 5/2021 | Sinha et al. | |
| 2021/0241168 A1 | 8/2021 | Sarferaz | |

OTHER PUBLICATIONS

Microsoft Computer Dictionary, 5th Edition, Microsoft Press, Redmond, WA, © 2002, pp. 30, 33 and 458.*

(Continued)

*Primary Examiner* — Robert Stevens
(74) *Attorney, Agent, or Firm* — Klarquist Sparkman, LLP

(57) ABSTRACT

Systems, methods, and computer program products for managing a lifecycle of a machine learning (ML) application from a consumer point of view are described herein. Execution of an intelligent scenario for training of the ML application is initiated. An integrator component generates a training pipeline. The training pipeline includes training logic associated with a defined workflow for the training. An application having an input dataset trains the ML application using the training pipeline. The integrator component determines training metrics associated with the trained ML application. The training metrics are indicators of a level of accuracy of the trained ML application. A centralized component provides the training metrics for characterization of the trained model.

19 Claims, 17 Drawing Sheets

(56) References Cited

OTHER PUBLICATIONS

Haight, Karen Zita, et al., "Machine Learning for Embedded Systems: A Case Study", BBN Report 8571, Mar. 16, 2015, pp. 1-12.*

Zhao, Zhenyu, et al., "Maximum Relevance and Minimum Redundancy Feature Selection Methods for a Marketing Machine Learning Platform", DSAA2019, Washington, DC, Oct. 5-8, 2019, pp. 442-452.*

Hazelwood, Kim, et al., "Applied Machine Language at Facebook: A Datacenter Infrastructure Perspective", HPCA 2018, Feb. 24-28, 2018, Vienna, Austria, pp. 620-629.*

Vartak, Manasi, et al., "MODELDB: A System for Machine Learning Model Management", HILDA '16, San Francisco, CA, Jun. 26, 2016, Article No. 14, pp. 1-3.*

Bernardo, Francisco, et al., "Interactive Machine Learning for End-User Innovation", 2017 AAAI Spring Symposium Series, Technical Report SS-17-04, ©2017 Association for the Advancement of Artificial Intelligence, pp. 369-375.*

* cited by examiner

MACHINE LEARNING LIFECYCLE MANAGEMENT

TECHNICAL FIELD

The subject matter described herein relates to enhanced techniques for lifecycle management of machine learning models.

BACKGROUND

Improved processing power, better algorithms, and the availability of Big Data are facilitating the implementation of machine learning (ML) functionality into a variety of different applications. The lifecycle of ML applications can include a number of functions ranging from training and deploying ML models to consuming data generated by intelligent services. With integration of ML application can require the use of lifecycle management techniques.

SUMMARY

In one aspect, a method for managing a lifecycle of a ML application from a consumer point of view is implemented by one or more data processors forming part of at least one computing device. Execution of an intelligent scenario for training of the ML application is initiated. An integrator component generates a training pipeline. The training pipeline includes training logic associated with a defined workflow for the training. An application having an input dataset trains the ML application using the training pipeline. The integrator component determines training metrics associated with the trained ML application. The training metrics are indicators of a level of accuracy of the trained ML application. A centralized component provides the training metrics for characterization of the trained model.

In some variations, the centralized component can trigger training via an application programming interface. The integrator component can provide a training status and a training identification associated with the training.

In other variations, a status of the training can be determined by the centralized component requesting a status update using the training identification. The integrator component can return an updated status associated with the requested status update. The centralized component can update training status with the returned updated status.

In some variations, the ML application can be created using a side-by-side ML architecture and the training pipeline can be generated by a data intelligence platform.

In other variations, the ML application cam be created using an embedded ML architecture and the training pipeline can be generated by a predictive analytics integrator (PAi). The embedded ML architecture can be an in-memory database system.

In some variations, the training pipeline can receive the input data set for the training. The ML application can be trained using the input dataset.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides ML functionality within in-memory database systems and lifecycle management of such functionality. Use of this subject matter can improve processing power and/or provide better algorithms for combining ML models with an in-memory database. Combining ML with in-memory database systems can facilitate consumption of intelligent services along with training and deploying ML models within an intelligent service.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Lifecycle management of ML applications can provide the operations qualities that customers expect from intelligent enterprise resource planning software. Lifecycle management as described herein considers both the consumer and provider of the ML application. Consumers can be customers who perform a number of tasks relating to operation of a ML application such as checking for any prerequisites required to run a ML scenario, performing setup the infrastructure, training and/or deploying ML models, and/or monitoring operation of the ML application. Providers can be software platforms having the capability to perform a number of tasks relating to execution of the ML application tasks such as implementing the ML application, assembling and/or delivering it to customers, providing the appropriate infrastructure and content for the ML application, performing software upgrades for the ML application, and/or applying corrections to the ML application. To handle the consumer lifecycle management aspects, an according coherent framework is described in more detail herein, which handles the following ML specific operations: Check, Setup, Train, Deploy, and Monitor. To handle the provider lifecycle management aspects according coherent framework is described in more detail herein, which handles the following ML specific operations: Assembly, Delivery, Provisioning, Upgrade, and Correction.

Figure 1:
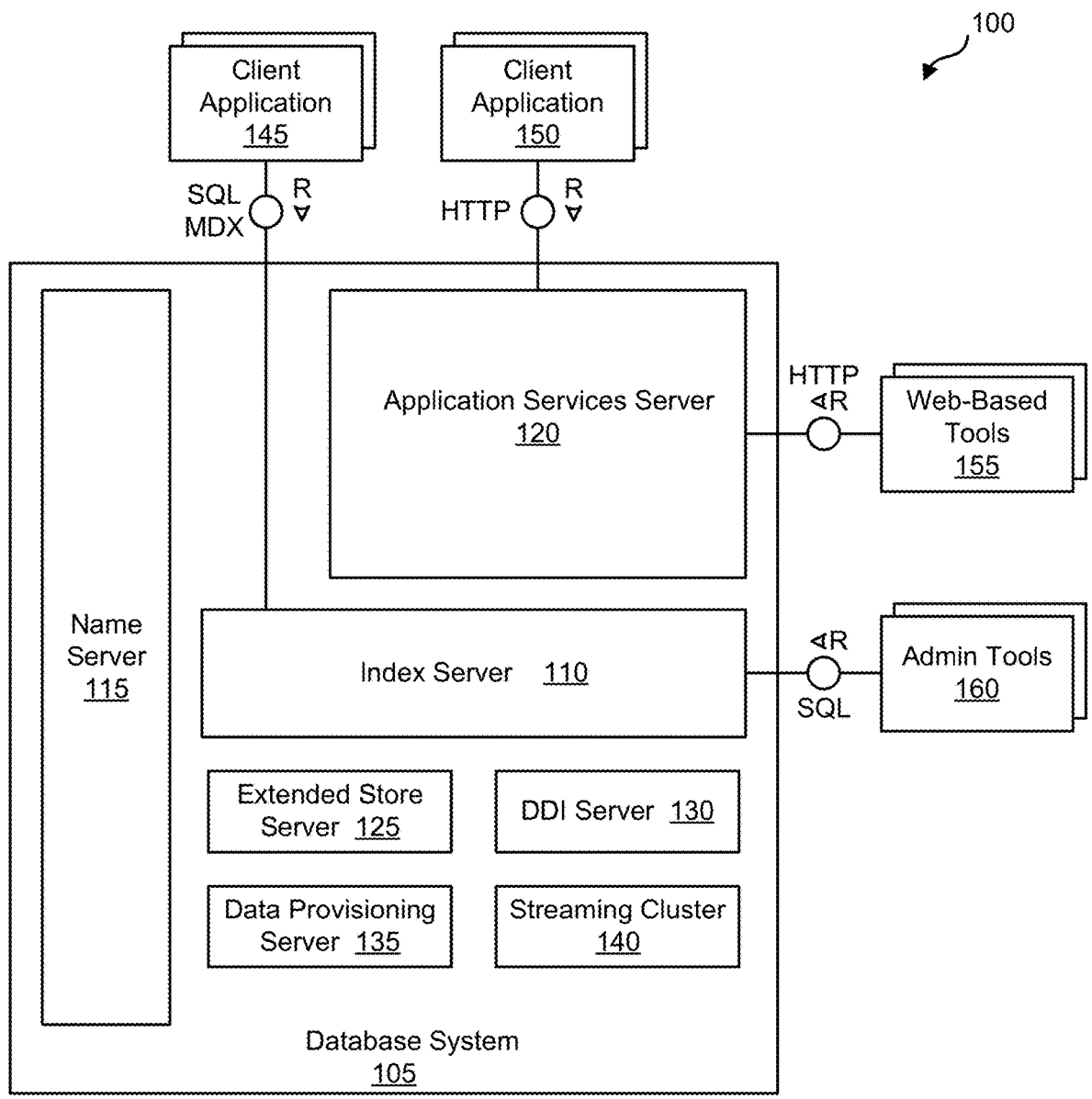
FIG. 1 is a system diagram illustrating an example database system for use in connection with the current subject matter.

FIG. 1 is a diagram 100 illustrating a database system 105 that can be used to implement aspects of the current subject matter. The database system 105 can, for example, be an in-memory database in which all relevant data is kept in main memory so that read operations can be executed without disk input output (I/O) and in which disk storage is required to make any changes durable. The database system 105 can include a plurality of servers including, for example, one or more of an index server 110, a name server 115, and/or an application server 120. The database system 105 can also include one or more of an extended store server 125, a database deployment infrastructure (DDI) server 130, a data provisioning server 135, and/or a streaming cluster 140. The database system 105 can be accessed by a plurality of remote clients 145, 150 via different protocols such as SQL/MDX (by way of the index server 110) and/or web-based protocols such as HTTP (by way of the application server 120).

The index server 110 can contain in-memory data stores and engines for processing data. The index server 110 can also be accessed by remote tools (via, for example, SQL queries), that can provide various development environment and administration tools. Additional details regarding an example implementation of the index server 110 is described and illustrated in connection with diagram 300 of FIG. 3.

The name server 115 can own information about the topology of the database system 105. In a distributed database system, the name server 115 can know where various components are running and which data is located on which server. In a database system 105 with multiple database containers, the name server 115 can have information about existing database containers and it can also host the system database. For example, the name server 115 can manage the information about existing tenant databases. Unlike a name server 115 in a single-container system, the name server 115 in a database system 105 having multiple database containers does not store topology information such as the location of tables in a distributed database. In a multi-container database system 105 such database-level topology information can be stored as part of the catalogs of the tenant databases.

The application server 120 can enable native web applications used by one or more remote clients 150 accessing the database system 105 via a web protocol such as HTTP. The application server 120 can allow developers to write and run various database applications without the need to run an additional application server. The application server 120 can also be used to run web-based tools 155 for administration, life-cycle management, and development. Other administration and development tools 160 can directly access the index server 110 for, example, via SQL and other protocols.

The extended store server 125 can be part of a dynamic tiering option that can include a high-performance disk-based column store for very big data up to the petabyte range and beyond. Less frequently accessed data (for which is it non-optimal to maintain in main memory of the index server 110) can be put into the extended store server 125. The dynamic tiering of the extended store server 125 allows for hosting of very large databases with a reduced cost of ownership as compared to conventional arrangements.

The DDI server 130 can be a separate server process that is part of a database deployment infrastructure (DDI). The DDI can be a layer of the database system 105 that simplifies the deployment of database objects using declarative design time artifacts. DDI can ensure a consistent deployment, for example by guaranteeing that multiple objects are deployed in the right sequence based on dependencies, and by implementing a transactional all-or-nothing deployment.

The data provisioning server 135 can provide enterprise information management and enable capabilities such as data provisioning in real time and batch mode, real-time data transformations, data quality functions, adapters for various types of remote sources, and an adapter software development kit (SDK) for developing additional adapters.

The streaming cluster 140 allows for various types of data streams (i.e., data feeds, etc.) to be utilized by the database system 105. The streaming cluster 140 allows for both consumption of data streams and for complex event processing.

Figure 2:
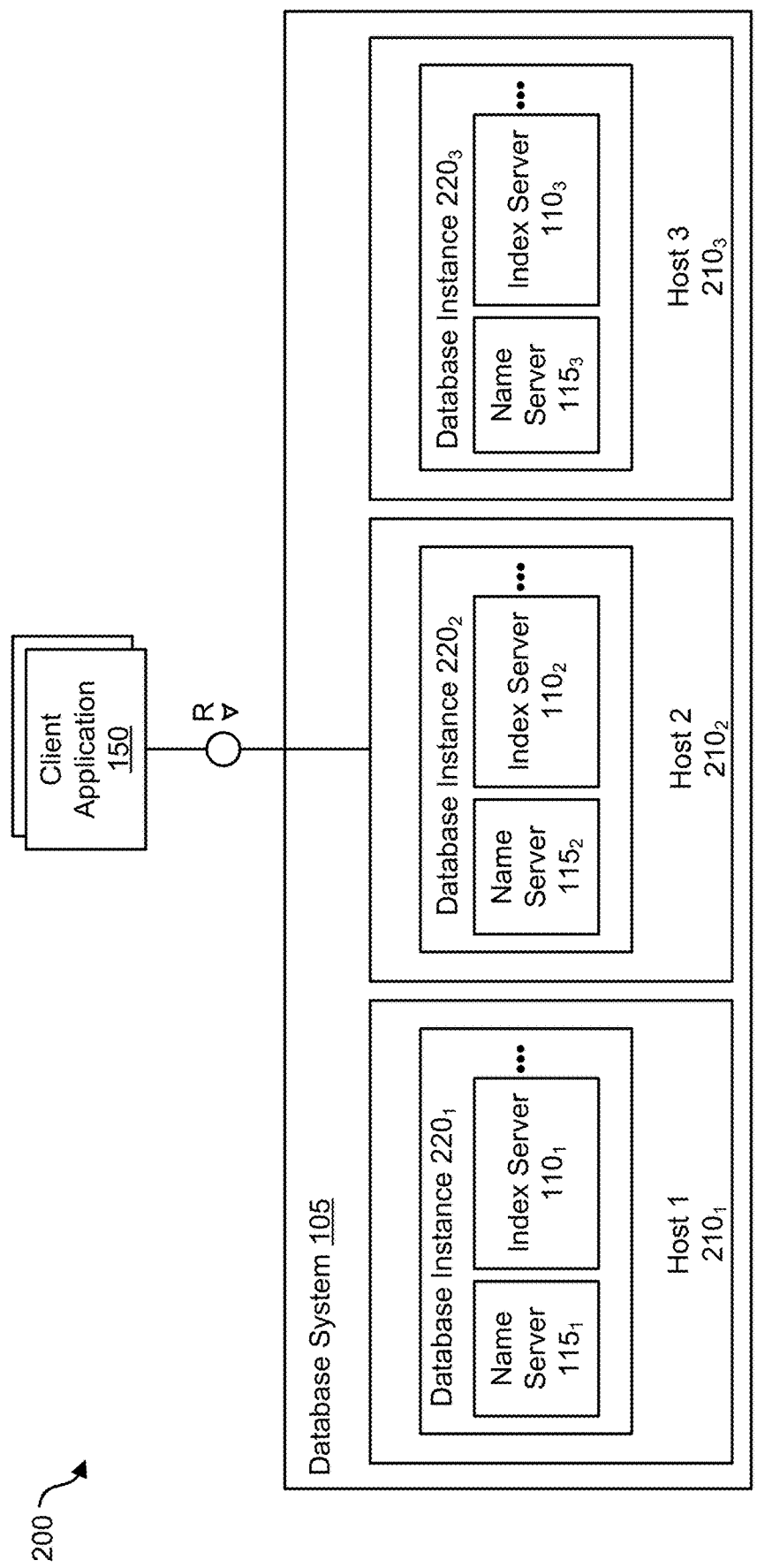
FIG. 2 is a system diagram illustrating an example database system that can support distribution of server components across multiple hosts for scalability and/or availability purposes for use in connection with the current subject matter.

FIG. 2 is a diagram 200 illustrating a variation of the database system 105 that can support distribution of server components across multiple hosts for scalability and/or availability purposes. This database system 105 can, for example, be identified by a single system ID (SID) and it is perceived as one unit from the perspective of an administrator, who can install, update, start up, shut down, or backup the system as a whole. The different components of the database system 105 can share the same metadata, and requests from client applications 150 can be transparently dispatched to different servers $110_{1-3}$, $120_{1-3}$, in the system, if required.

As is illustrated in FIG. 2, the distributed database system 105 can be installed on more than one host $210_{1-3}$. Each host $210_{1-3}$ is a machine that can comprise at least one data processor (e.g., a CPU, etc.), memory, storage, a network interface, and an operation system and which executes part of the database system 105. Each host $210_{1-3}$ can execute a database instance $220_{1-3}$ which comprises the set of components of the distributed database system 105 that are installed on one host $210_{1-3}$. FIG. 2 shows a distributed system with three hosts, which each run a name server $110_{1-3}$, index server $120_{1-3}$, and so on (other components are omitted to simplify the illustration).

Figure 3:
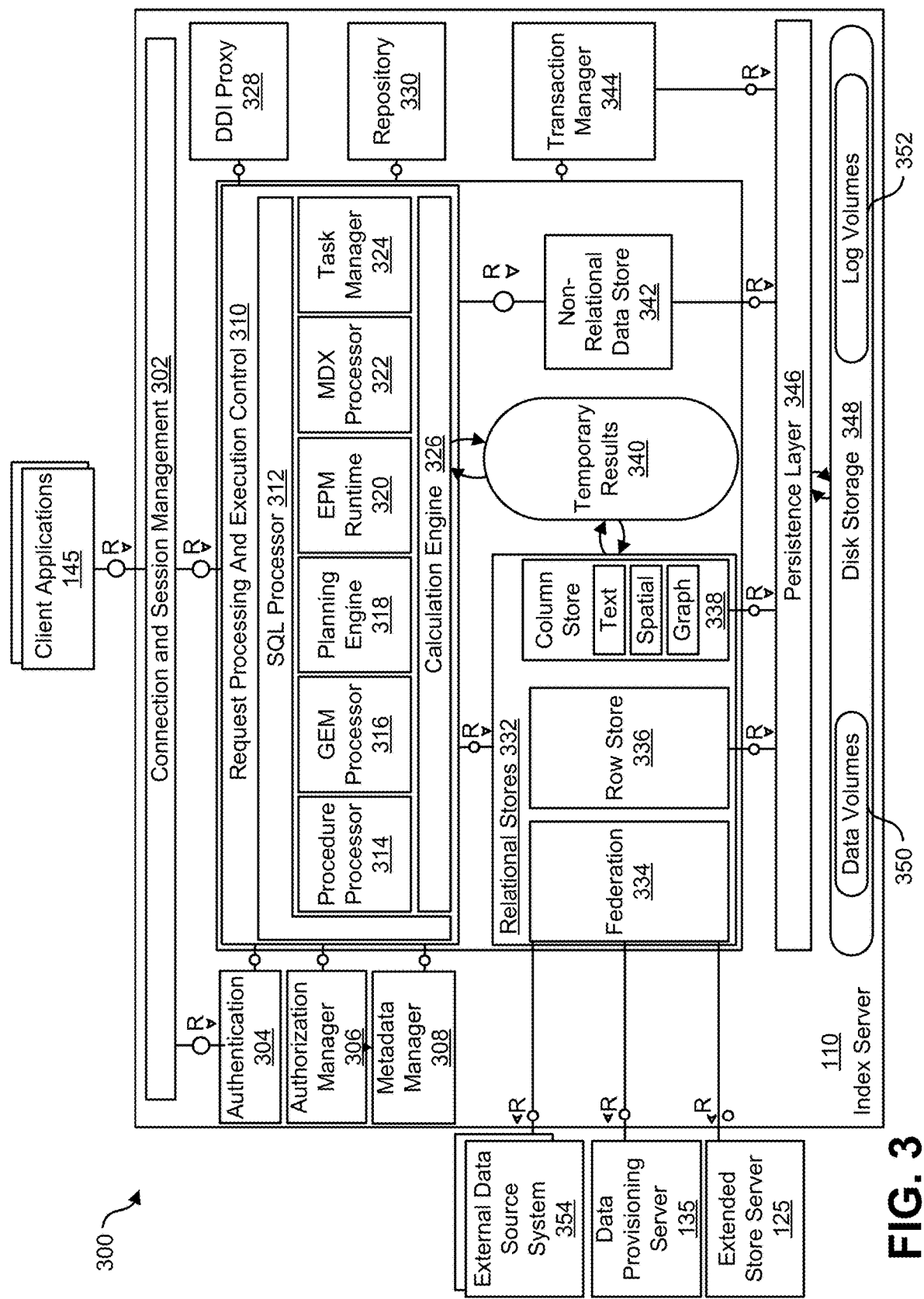
FIG. 3 is a diagram illustrating an architecture for an index server for use in connection with the current subject matter.

FIG. 3 is a diagram 300 illustrating an architecture for the index server 110 (which can, as indicated above, be one of many instances). A connection and session management component 302 can create and manage sessions and connections for the client applications 145. For each session, a set of parameters can be maintained such as, for example, auto commit settings or the current transaction isolation level.

Requests from the client applications 145 can be processed and executed by way of a request processing and execution control component 310. The database system 105 offers rich programming capabilities for running application-specific calculations inside the database system. In addition to SQL, MDX, and WIPE, the database system 105 can provide different programming languages for different use cases. SQLScript can be used to write database procedures and user defined functions that can be used in SQL statements. The L language is an imperative language, which can be used to implement operator logic that can be called by SQLScript procedures and for writing user-defined functions.

Once a session is established, client applications 145 typically use SQL statements to communicate with the index server 110 which can be handled by a SQL processor 312 within the request processing and execution control component 310. Analytical applications can use the multidimensional query language MDX (MultiDimensional eXpressions) via an MDX processor 322. For graph data, applications can use GEM (Graph Query and Manipulation) via a GEM processor 316, a graph query and manipulation language. SQL statements and MDX queries can be sent over the same connection with the client application 145 using the same network communication protocol. GEM statements can be sent using a built-in SQL system procedure.

The index server 110 can include an authentication component 304 that can be invoked with a new connection with a client application 145 is established. Users can be authenticated either by the database system 105 itself (login with user and password) or authentication can be delegated to an external authentication provider. An authorization manager 306 can be invoked by other components of the database system 105 to check whether the user has the required privileges to execute the requested operations.

Each statement can be processed in the context of a transaction. New sessions can be implicitly assigned to a new transaction. The index server 110 can include a transaction manager 344 that coordinates transactions, controls transactional isolation, and keeps track of running and closed transactions. When a transaction is committed or rolled back, the transaction manager 344 can inform the involved engines about this event so they can execute necessary actions. The transaction manager 344 can provide various types of concurrency control and it can cooperate with a persistence layer 346 to achieve atomic and durable transactions.

Incoming SQL requests from the client applications 145 can be received by the SQL processor 312. Data manipulation statements can be executed by the SQL processor 312 itself. Other types of requests can be delegated to the respective components. Data definition statements can be dispatched to a metadata manager 306, transaction control statements can be forwarded to the transaction manager 344, planning commands can be routed to a planning engine 318, and task related commands can forwarded to a task manager 324 (which can be part of a larger task framework). Incoming MDX requests can be delegated to the MDX processor 322. Procedure calls can be forwarded to the procedure processor 314, which further dispatches the calls, for example to a calculation engine 326, the GEM processor 316, a repository 300, or a DDI proxy 328.

The index server 110 can also include a planning engine 318 that allows planning applications, for instance for financial planning, to execute basic planning operations in the database layer. One such basic operation is to create a new version of a data set as a copy of an existing one while applying filters and transformations. For example, planning data for a new year can be created as a copy of the data from the previous year. Another example for a planning operation is the disaggregation operation that distributes target values from higher to lower aggregation levels based on a distribution function.

The SQL processor 312 can include an enterprise performance management (EPM) runtime component 320 that can form part of a larger platform providing an infrastructure for developing and running enterprise performance management applications on the database system 105. While the planning engine 318 can provide basic planning operations, the EPM platform provides a foundation for complete planning applications, based on by application-specific planning models managed in the database system 105.

The calculation engine 326 can provide a common infrastructure that implements various features such as SQLScript, MDX, GEM, tasks, and planning operations. The SQLScript processor 312, the MDX processor 322, the planning engine 318, the task manager 324, and the GEM processor 316 can translate the different programming languages, query languages, and models into a common representation that is optimized and executed by the calculation engine 326. The calculation engine 326 can implement those features using temporary results 340 which can be based, in part, on data within the relational stores 332.

Metadata can be accessed via the metadata manager component 306. Metadata, in this context, can comprise a variety of objects, such as definitions of relational tables, columns, views, indexes and procedures. Metadata of all these types can be stored in one common database catalog for all stores. The database catalog can be stored in tables in a row store 336 forming part of a group of relational stores 332. Other aspects of the database system 105 including, for example, support and multi-version concurrency control can also be used for metadata management. In distributed systems, central metadata is shared across servers and the metadata manager 306 can coordinate or otherwise manage such sharing.

The relational stores 332 form the different data management components of the index server 110 and these relational stores can, for example, store data in main memory. The row store 336, a column store 338, and a federation component 334 are all relational data stores which can provide access to data organized in relational tables. The column store 338 can store relational tables column-wise (i.e., in a column-oriented fashion, etc.). The column store 338 can also comprise text search and analysis capabilities, support for spatial data, and operators and storage for graph-structured data. With regard to graph-structured data, from an application viewpoint, the column store 338 could be viewed as a non-relational and schema-flexible in-memory data store for graph-structured data. However, technically such a graph store is not a separate physical data store. Instead, it is built using the column store 338, which can have a dedicated graph Application Program Interface (API).

The row store 336 can store relational tables row-wise. When a table is created, the creator can specify whether it should be row or column-based. Tables can be migrated between the two storage formats. While certain SQL extensions are only available for one kind of table (such as the "merge" command for column tables), standard SQL can be used on all tables. The index server 110 also provides functionality to combine both kinds of tables in one statement (join, sub query, union).

The federation component 334 can be viewed as a virtual relational data store. The federation component 334 can provide access to remote data in external data source system (s) 354 through virtual tables, which can be used in SQL queries in a fashion similar to normal tables.

The database system 105 can include an integration of a non-relational data store 342 into the index server 110. For example, the non-relational data store 342 can have data represented as networks of C++ objects, which can be persisted to disk. The non-relational data store 342 can be used, for example, for optimization and planning tasks that operate on large networks of data objects, for example in supply chain management. Unlike the row store 336 and the column store 338, the non-relational data store 342 does not use relational tables; rather, objects can be directly stored in containers provided by the persistence layer 346. Fixed size entry containers can be used to store objects of one class. Persisted objects can be loaded via their persisted object IDs, which can also be used to persist references between objects. In addition, access via in-memory indexes is supported. In that case, the objects need to contain search keys. The in-memory search index is created on first access. The non-relational data store 342 can be integrated with the transaction manager 344 to extend transaction management with sub-transactions, and to also provide a different locking protocol and implementation of multi version concurrency control.

An extended store is another relational store that can be used or otherwise form part of the database system 105. The extended store can, for example, be a disk-based column store optimized for managing very big tables, which ones do not want to keep in memory (as with the relational stores 332). The extended store can run in an extended store server 125 separate from the index server 110. The index server 110 can use the federation component 334 to send SQL statements to the extended store server 125.

The persistence layer 346 is responsible for durability and atomicity of transactions. The persistence layer 346 can ensure that the database system 105 is restored to the most recent committed state after a restart and that transactions are either completely executed or completely undone. To achieve this goal in an efficient way, the persistence layer 346 can use a combination of write-ahead logs, shadow paging and save points. The persistence layer 346 can provide interfaces for writing and reading persisted data and it can also contain a logger component that manages a transaction log. Recovery log entries can be written in the persistence layer 346 (in recovery log volumes 352) explicitly by using log interface or implicitly when using the virtual file abstracting. The recovery log volumes 352 can include redo logs which specify database operations to be replayed whereas data volume 350 contains undo logs which specify database operations to be undone as well as cleanup logs of committed operations which can be executed by a garbage collection process to reorganize the data area (e.g., free up space occupied by deleted data etc.).

The persistence layer 346 stores data in persistent disk storage 348 which, in turn, can include data volumes 350 and/or transaction log volumes 352 that can be organized in pages. Different page sizes can be supported, for example, between 4 k and 16M. Data can be loaded from the disk storage 348 and stored to disk page wise. For read and write access, pages can be loaded into a page buffer in memory. The page buffer need not have a minimum or maximum size, rather, all free memory not used for other things can be used for the page buffer. If the memory is needed elsewhere, least recently used pages can be removed from the cache. If a modified page is chosen to be removed, the page first needs to be persisted to disk storage 348. While the pages and the page buffer are managed by the persistence layer 346, the in-memory stores (i.e., the relational stores 332) can access data within loaded pages.

Figure 4:
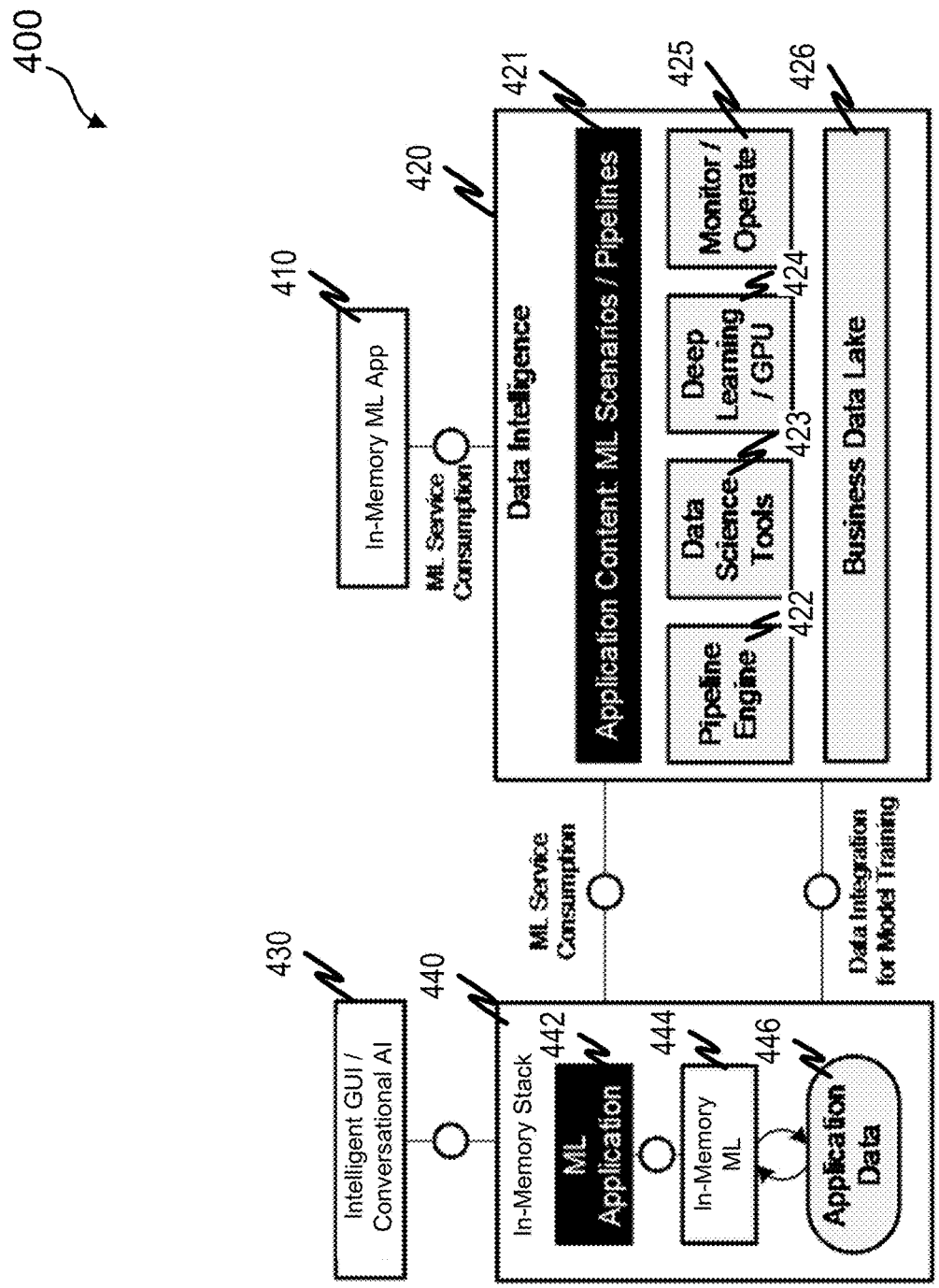
FIG. 4 depicts an example of a database architecture with an embedded ML functionality.

FIG. 4 depicts an example of a database architecture 400 with an embedded ML functionality. Database architecture 400 can be, for example, an in-memory database having embedded ML functionality. Database architecture 400 can include an in-memory stack 410, data intelligence platform 420, an in-memory stack 440 having functionality as described in FIGS. 1-3, and an intelligent graphical user interface (GUI)/conversational artificial intelligence (AI) 440. Using data intelligence 420, additional features can be integrated into an in-memory stack 440 as the platform covers the entire spectrum of lifecycle management, ranging from consuming intelligent services up to training and deploying own ML models. The database architecture can increase operational speed to the in-memory database 440 by combining analytical and transactional data.

Use cases such forecasting, key influencers, and/or trending can be solved with classic algorithms like regression, clustering, classification or time series analysis. Those algorithms may not consume much memory and CPU time. With minimal consumption, such use cases can be implemented within the in-memory stack 440. In-memory stack 440 is an example embedded ML architecture (e.g., ML capabilities are built-into the in-memory stack 440). The in-memory stack 440 can also include in-memory ML 444 that consumes business processes as well as the application data 446 for model training of a ML model. This embedded ML architecture of in-memory stack 440 has very low total cost of ownership (TCO) and TCD. As illustrated in FIG. 4, the embedded ML within in-memory stack 440 can include functionality such as Predictive Analytics Library (PAL) and Automated Predictive Library (APL).

Use cases such as image recognition, sentimental analysis, and/or natural language processing can require deep learning algorithms based on neuronal networks. For model training, these kinds of algorithms can demand large volumes of data and/or consume graphical processing unit (GPU) time. Such use cases can be implemented using data intelligence platform 420. Using data intelligence platform 420, the load in the transactional in-memory stack 440 can be kept low. Data intelligence platform 420 can include application content 421 (e.g., ML scenarios/pipelines), a pipeline engine 422, data science tools 423, deep learning/GPU 424, monitor/operate functionality 425, and a business data lake 426. Data intelligence platform 420 is an example side-by-side ML architecture. Business data lake 426 can include requested data such as images, audios, text documents, historical data, and/or application. In some variations, consumption of data generated by the trained model can occur on remote interfaces (e.g., in-memory ML application 410). In other variations, such as for mass processing, the remote interfaces (e.g., in-memory ML application 410) must be bulked enabled or local deployment of inference models must be provided.

Conversational user interface (UI) for natural language interaction with in-memory stack 440 can be enabled by a digital assistant such as intelligent GUI/conversational AI 430. Intelligent GUI/conversational AI 430 is a self-learning solution using machine learning functionality to gain knowledge based on historic data and experience. ML requires additional visualization capabilities on the user interface, e.g. for illustrating confidence intervals or forecasting charts.

With machine learning, certain aspects can be considered in lifecycle management to provide the operations qualities customers expect from an intelligent ERP. Both the consumer and provider of the ML application can be considered for lifecycle management techniques.

Figure 5A:
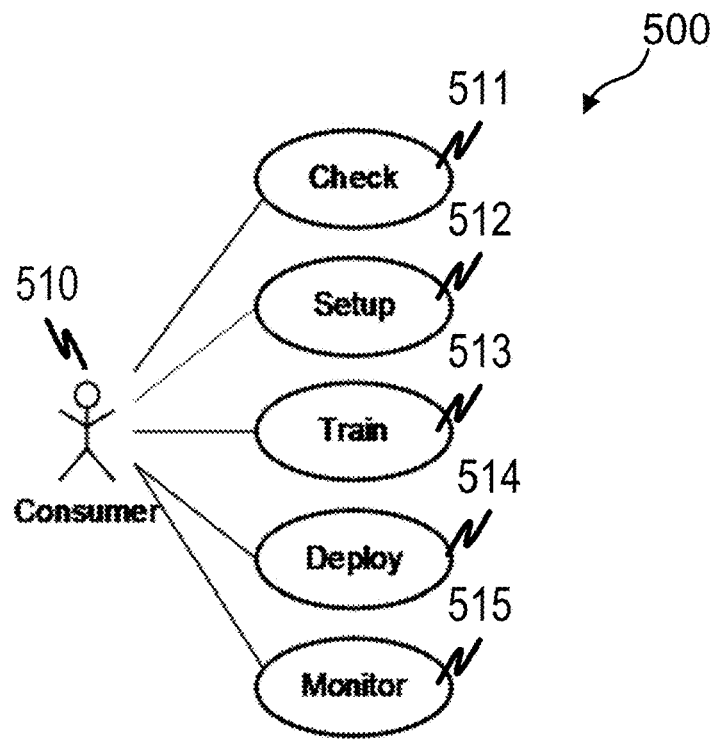
FIG. 5A illustrates a diagram of example steps a consumer can take to consume data generated by and/or operate ML applications.

Consumer can be customers who like to understand the value, prerequisites, and/or the required infrastructure to use a particular ML application. FIG. 5A illustrates a diagram 500 of example steps a consumer 510 can take to consume data generated by and/or operate ML applications. It can be difficult for a consumer 510 to understand which technical and/or business pre-requisites are required to train and consume ML scenarios. For example, such pre-requisites can include sufficient data volumes being in place for training of ML algorithms. Additionally, a consumer 510 may not understand that underlying business processes must be activated and configured in order to have a meaningful foundation for the training process. A pre-requisite check, at step 511, can automatically validate, for each ML scenario, whether sufficient data is available for the ML algorithm to be trained. If there is not enough data, then the algorithm cannot learn or make recommendations to the consumer 510. In other examples, consumer 510 can automatically check, at 511, whether particular process configurations are available to the ML algorithm or whether an ML application can be run on the particular hardware.

Before consumer 510 can start using side-by-side ML scenarios, connectivity to a development infrastructure is established. Within this onboarding process, a consumer account with a service entitlement and a service key is created. The content of the service key can provides information for the initial communication configuration on the in-memory stack 440 side to access the machine learning services in the development infrastructure. This operation model can be manual, time consuming, and hard to control for consumer 510. System setup can be automatically performed, at step 512, using a tool such as a wizard. With a side-by-side architecture, for example, setup may be required to establish communication between data intelligence platform 420 and in-memory stack 440. Such communication can facilitate data integration for model training. During system setup, consumer 510 can be assisted through steps of provisioning and/or connecting the development infrastructure.

A ML requiring training in order to consume and/or analyze data.

Training can be dependent upon the type of algorithm the ML model is expected to run. The ML model can be trained by consumer 510 providing one or more datasets to the ML model. The training process by a consumer 510 can be manual, time intense, and/or non-transparent. Additionally, calculated model accuracy key performance indicators (KPIs) may not be sufficient to determine whether the ML model is ready to use. The training, at step 513, can be self-service for the consumer 510. Consumer 510 can be enabled to adjust parameters to make a successful training possible. For example, consumer 510 can evaluate KPIs to determine whether the ML model requires additional training via more datasets. Errors and warnings can be presented in a language that non-ML experts understand (e.g., consumer 510) so that issues can be remedied by consumer 510. In some variations, fully automated training runs can occur using scheduled jobs. In additional variations, event-driven triggering of training jobs may also be possible.

Once the ML is trained, as indicated by the KPIs, then consumer 510 can deploy, at step 514, the ML model. In other words, consumer 510 can control the timing of deployment and/or activation of one or more trained models. The trained ML model can provide future predictions or recommendations back to the consumer 510. Consumer 510 can also deactivate or un-deploy models. The history of such model activation and/or deactivation can be recorded to enable provider 560 to monitor and audit such activities.

Consumer 510 can monitor, at step 515, the use of the deployed ML model. During monitoring, consumer 510 can evaluate whether the deployed ML model is outputting sufficient results (e.g., evaluate the quality of productively used models at runtime). Monitoring provides consumers 510 with a comprehensive view of the ML model. The ML model contains a central cockpit (or centralized component) for various ML scenarios and can provide consumer 510 with various indications such as model status, accuracy KPIs, state of inference calls, or amount of processed data. In some cases, the deployed ML model can experience technical issues or connectivity issues. Consumer 510 can monitor for such issues. There may come a time when the trained ML model no longer outputs accurate results and requires re-training. The ML models are consuming historical data to learn from, but as time progresses, new data is generated that can be used to re-train the ML model. In case of issues, alerts can be provided to consumer 510 (e.g., via a UI) to inform the consumer 510 to act. In some variations, solution proposals can be recommended to administrators for resolving issues as well as statistics (e.g., number of errors, resources consumption or costs).

Figure 5B:
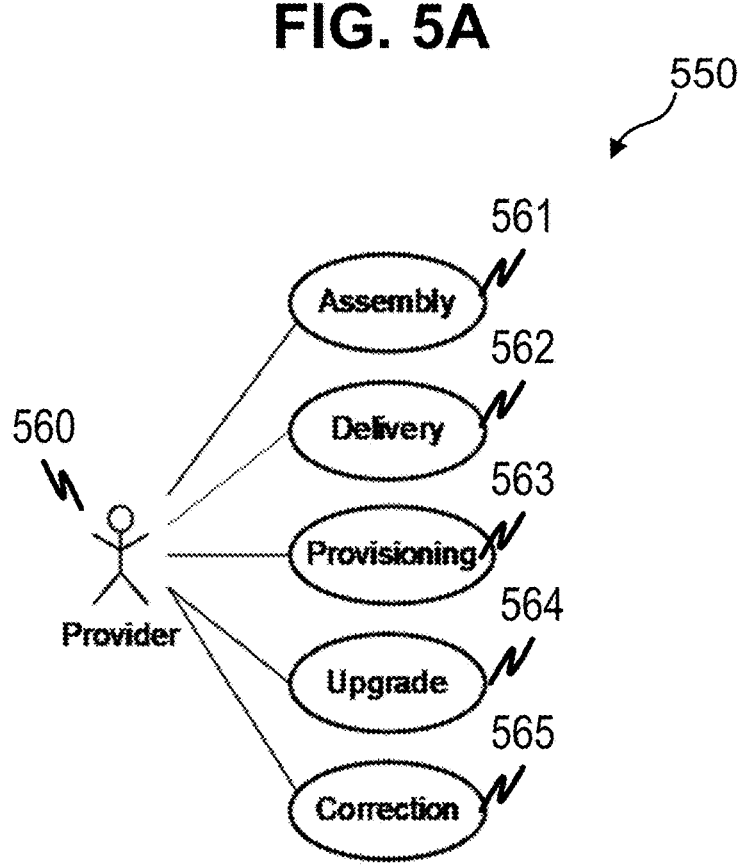
FIG. 5B illustrates a diagram of example steps a provider can take operate ML scenarios.

Providers of ML applications can be a development and/or operational teams who are developing and delivering (e.g., providing) ML applications for consumers to use. FIG. 5B illustrates a diagram 550 of example steps a provider 560 can take operate ML scenarios. A provider 560 can assemble, at step 561, various artifacts to create an application (e.g., algorithms, data source(s), ML illustrations for the user interface, etc.). For example, provider 560 can deliver, at step 562, an application to the consumer 510 by uploading the application to a website or other delivery channel. A provider 560 can also provision, at step 563, content for the application from, for example, pipeline engine 422. The provisioned content can assist the consumer 510 with installing the ML application on a consumer system. Once the application is provisioned, consumer can execute steps 510 through step 515 as described in FIG. 5A.

During the lifetime of the ML application, provider 560 may upgrade the application, at 564 to provide one or more new capabilities to the ML application. For example, the ML application can have new algorithms added or provide additional data features. An upgrade should not break or invalidate a trained productive ML model, or the business process based on it in an unexpected manner. In some cases, there may be software bugs or other issues with the ML application that requires corrections. In these cases, the provider 560 can provide corrections, at step 565, to address such issues.

Figure 6:
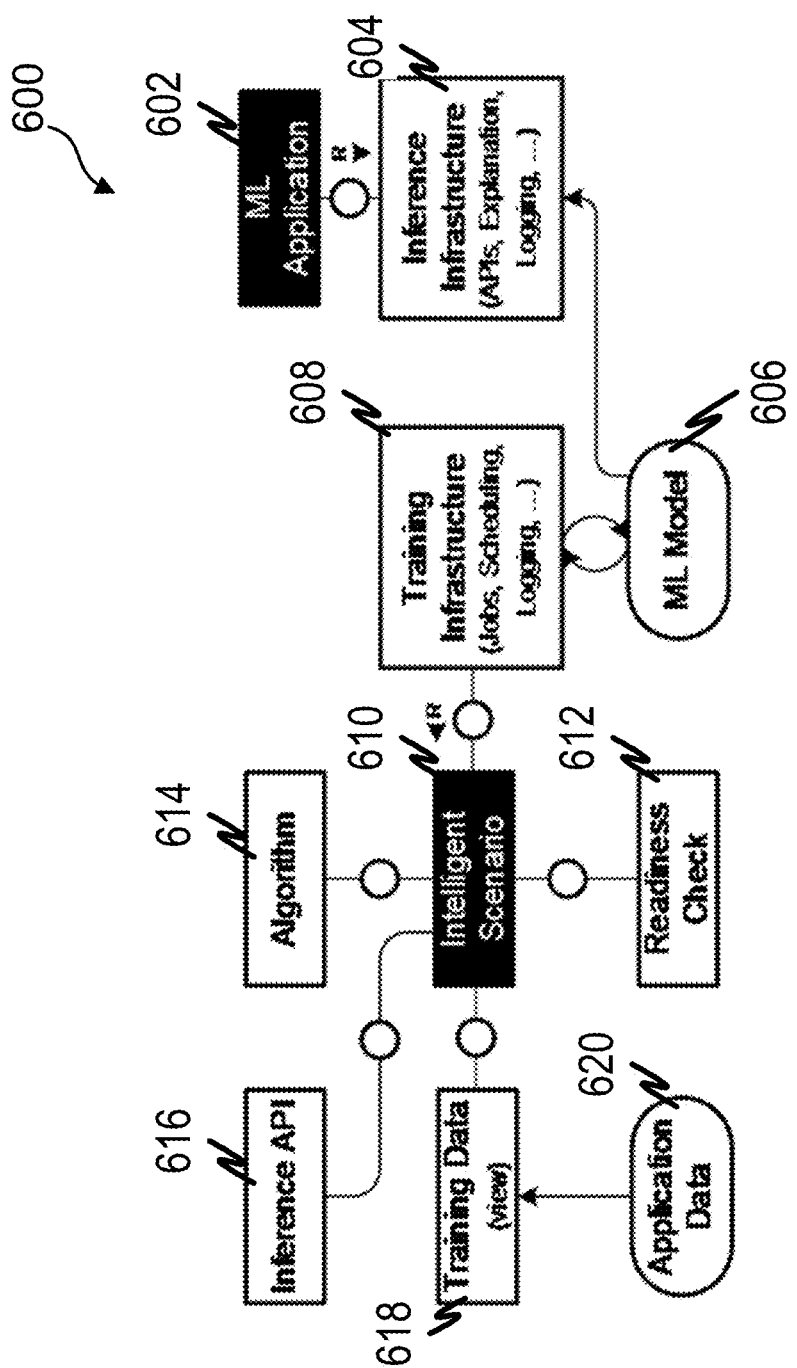
FIG. 6 illustrates an example architecture for ML lifecycle management.

FIG. 6 illustrates an example architecture 600 for ML lifecycle management. ML application 602 provides ML capabilities to a consumer 510. The ML capabilities can be implemented using an intelligent scenario 610. The intelligent scenario 610 is the central design time entity covering artifacts that are required for the implementation of the ML scenario. Semantically, the intelligent scenario 610 represents the key questions which shall be solved with ML algorithm 614. Users of the ML model can determine various data features required for the ML algorithm 614. The ML model can be trained using training data 618. Training data 618 can be generated using application data 620. A view of the application data 620 can be provided as training data 618. The application data 620 can be span multiple application tables and/or perform preliminary data transformations. A signature for an inference application programming interface (API) 616 can also be defined during design time as part of the intelligent scenario 610. The consuming application and/or business processes can integrate the inference API 616 during design time.

Before ML models are trained, pre-requisite checks (e.g., readiness check 612) can be performed. The pre-requisite checks can be ML scenario specific checks that validate whether the pre-requisites for the training are present (e.g., sufficient application data is available or necessary process configurations are complete). After the pre-requisite checks have been passed successfully the training can be triggered. Training infrastructure 608 can be used to train the ML model. Training infrastructure reads metadata from the corresponding intelligent scenario 610, runs the training, and stores the trained model. Inference infrastructure 604 can provide a consumption API for the specific scenario and model and integrate the ML model into applications and business processes.

Figure 7:
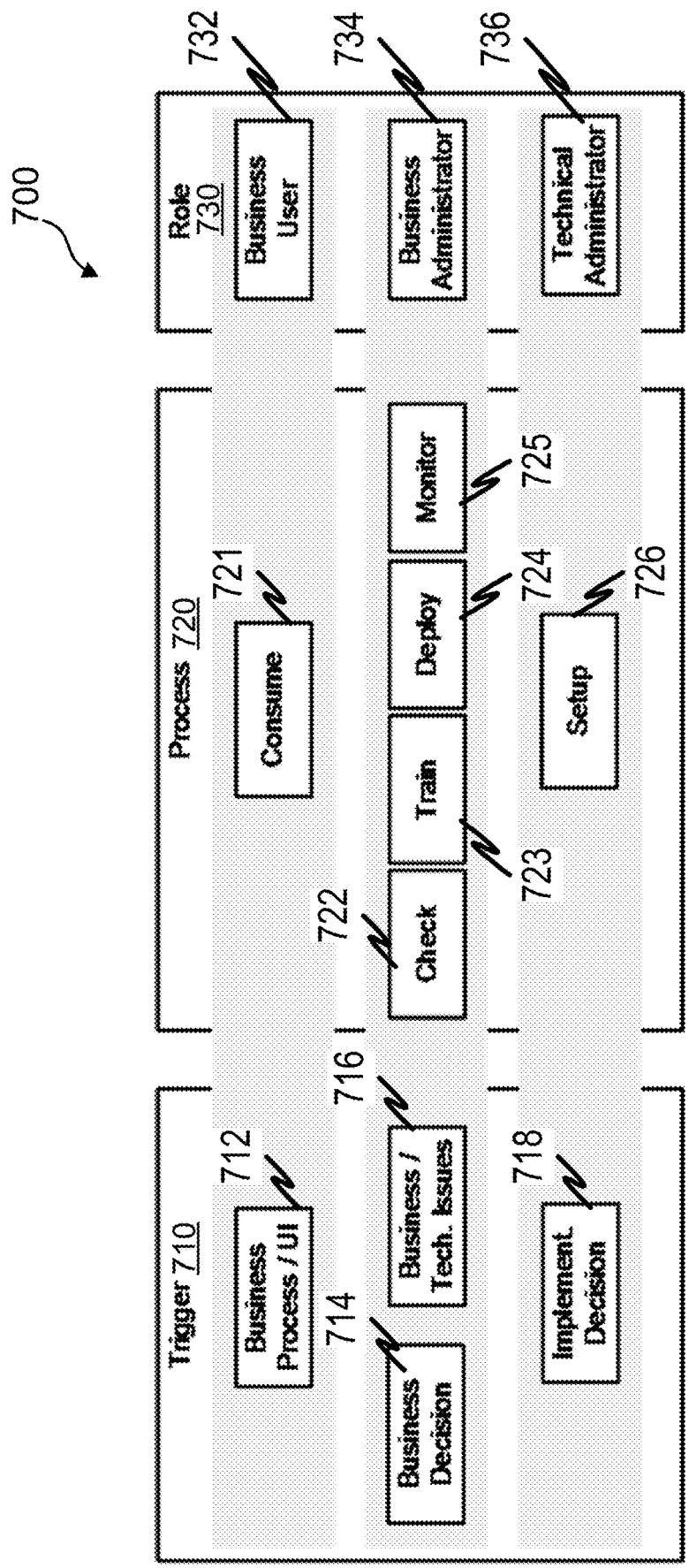
FIG. 7 illustrates a block diagram of the processes, triggers, and roles that can be associated with lifecycle management of a ML application from the consumer point of view.

FIG. 7 illustrates a block diagram 700 of the processes 720, triggers 710, and roles 730 that can be associated with lifecycle management of a ML application from the consumer point of view. During a lifecycle of a ML application, there are a number of roles 730, from a consumer point of view, which interact with the ML application. Such roles can include a business user 732, a business administrator 734, and/or a technical administrator 736. When interacting with a ML application, each role can have one or more triggers 710 that initiate various processes 720 of the ML application. The lifecycle of a ML application can be initiated (or triggered) by a number of different triggers 710 such as business processes 712, business decisions 714, business or technical issues 716, and/or an implementation decision 718. After being triggered, one or more processes 720 can occur that are associated with the ML application. Such processes can include consumption of data generated by the ML application 721, checking pre-requisites for the ML application 722, training the ML application 723, deploying the ML application 724, monitoring the ML application 725, and/or setup of the ML application 726.

For example, business users can consume 721 ML applications to complete daily tasks and/or fulfill business needs. Such consumption can triggered based on a business process using a UI 712. In another example, business administrators can perform pre-requisite checks 722 and train the ML application 723 as described in FIG. 5A. The results of which can be the basis to decide whether the ML scenario can be deployed 724. If business administrator 734 decides to deploy 724 the ML application, then technical administrators 736 can execute the setup 726 (as described in FIG. 5B) while the business administrator 734 performs the training 723 and deployment 724 of the ML application (as described in FIG. 5A). The business administer 734 can continuously monitor 725 the ML application by monitoring various alerts of business and/or technical issues (e.g., inference API provides wrong results or the training job allocates to much system resources) as described in FIG. 5A.

Figure 8:
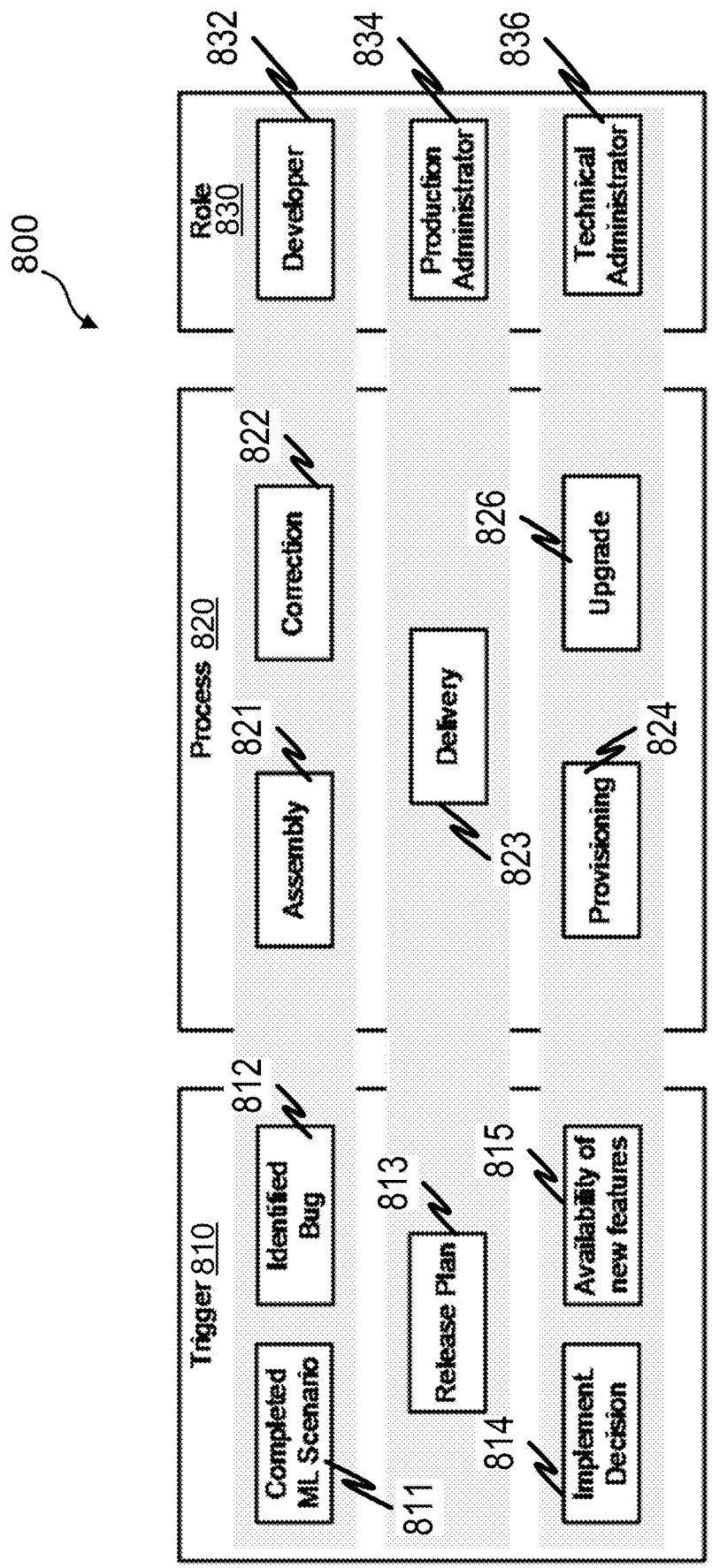
FIG. 8 illustrates a block diagram of the processes, triggers, and roles 830 that can be associated with lifecycle management of a ML application from the provider point of view.

FIG. 8 illustrates a block diagram 800 of the processes 820, triggers 810, and roles 830 that can be associated with lifecycle management of a ML application from the provider point of view. Similar to FIG. 7, during a lifecycle of a ML application, there are a number of roles 830, from a provide point of view, which interact with the ML application. Such roles can include a developer 832, a production administrator 834, or a technical administrator 836. When interacting with a ML application, each role can have one or more triggers 810 that initiate various processes 820 of the ML application. The lifecycle of a ML application can be initiated (or triggered) by a number of different triggers 810 such as completing a ML scenario 811, identifying a software bug 812, timing of a release plan 813 (e.g., every quarter, once a year, once every other year, etc.), implementing a decision 814, and/or the availability of new features 815. After being triggered, one or more processes 820 can occur that are associated with the ML application. Such processes can include assembling artifacts for the ML application 821, making corrections to the ML application 822, delivering the ML application 823, provisional the ML application 824, and/or upgrading the ML application 825.

For example, a developer 832 can assemble artifacts 821 (e.g., training data sources, ML logic, integration into business processes, user interfaces, etc.) and/or provide correction to the ML application 822, as described in FIG. 5B. Such processes can be triggered by the completion of a ML scenario 811 or the identification of a software bug 812. The assembled artifacts can be transported from development to validation and assembly systems by developers 832. A completed ML scenario 811 can be packaged by a production administrator 834 for delivery 823. Such delivery can be triggered by a release plan 813 that defines points in time when delivery should occur. After consumers decide to implement the ML scenario 814, the according ML content cam provisioned 824 in the system landscape by a technical administrator 836, as described in FIG. 5B. A technical administrator 936 can also implement new capabilities, based on the availability of same 815, for the ML scenario which can be applied by consumers as upgrades 826.

Figure 9:
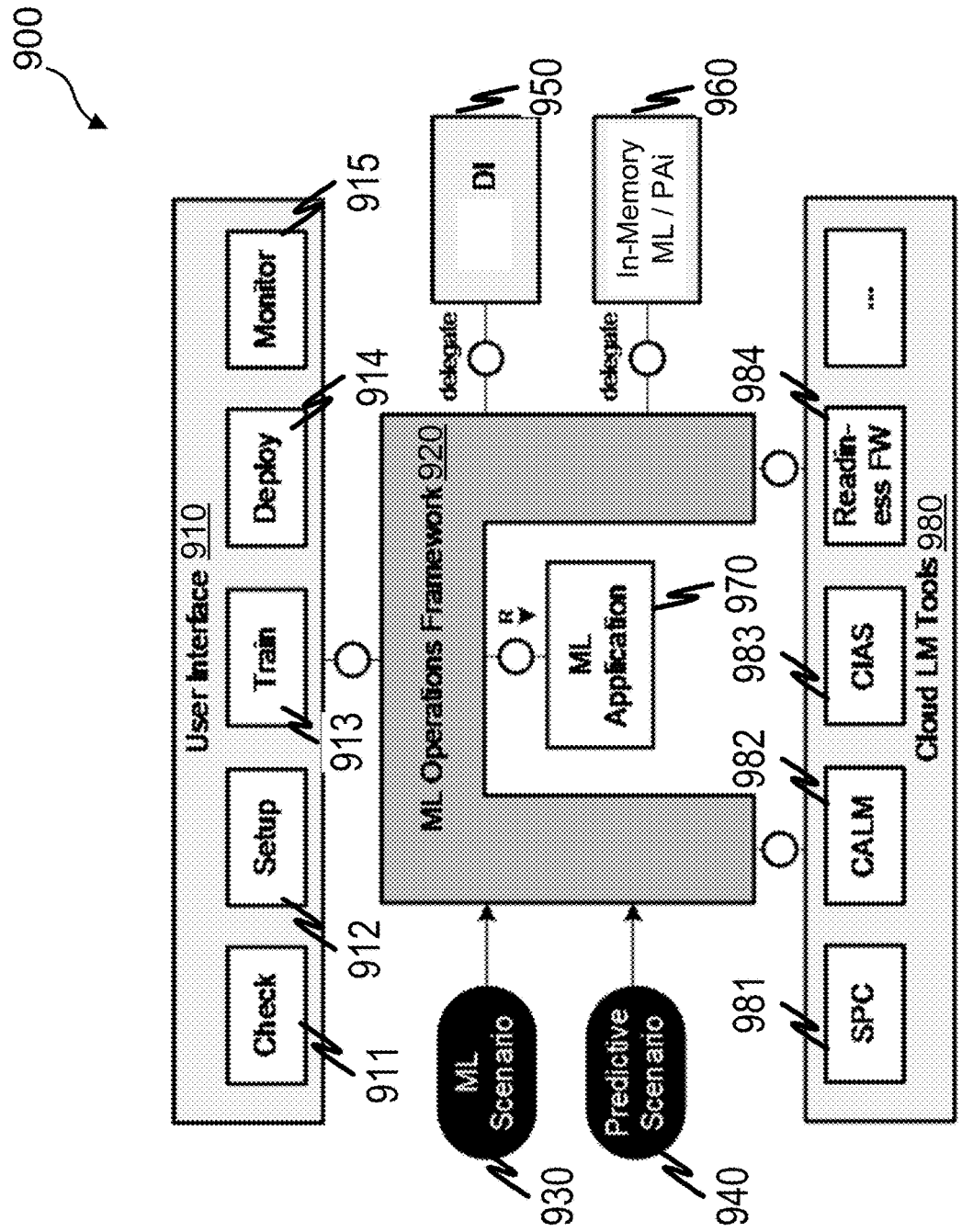
FIG. 9 illustrates an example software architecture diagram for ML lifecycle management of a ML application from consumer point of view.

FIG. 9 illustrates an example software architecture diagram 900 for ML lifecycle management of a ML application 970 from consumer point of view. Such architecture can be used to perform the following consumer processes described in FIG. 5A and FIG. 7: check 911, setup 912, train 913, deploy 914, and/or monitor 915. The consumer lifecycle management capabilities can be handled by the ML operations framework 920. The ML operations framework 920 can be a capability integrated within, for example, using an application server programming language through a software component. The ML operations framework 920 can be available for on premise and/or cloud versions in the software component to enable the in-memory database business applications to consume ML scenarios. The ML operations framework 920 can be on enablement and harmonization of the operations of ML scenarios in the in-memory database.

The ML operations framework 920 can harmonize the lifecycle management operations, via a user interface 910, such as pre-requisite check 911, training 913, deployment 94, activation, deactivation, monitoring 915, and/or inference consumption across various business domain-specific ML scenarios. The ML operations framework 920 can provide more simple functionalities and features to non-ML experts for performing the lifecycle management operations of ML scenarios. The complexity of handling the ML scenarios 930 in different stacks such as an in-memory stack 960 or data intelligence platform 950 can be simplified in the lifecycle management framework.

From the customer perspective, the different lifecycle management between the in-memory stack 960 and the data intelligence platform 950 for specific to intelligent scenarios (e.g., predictive scenarios 940) can be orchestrated with the ML operations framework 920. The ML operations framework 920 can empower the business administrators 734 to perform lifecycle management operations of ML scenarios 930 such as self-service from a central cockpit (or centralized component). The ML operations framework 920 can incorporate existing Predictive Analytics Integrator (PAi) framework 960 within the embedded ML architecture. Such inclusion facilitates a harmonized operational experience for embedded ML architectures as well as to side-by-side ML architectures. For the side-by-side scenarios, the ML operations framework 920 utilizes a high-level programming language for integration with the data intelligence platform 950. ML operations framework 920 contains logic to invoke the data intelligence specific APIs. The data intelligence platform 950 can provide a set of HTTP APIs for various aspects such as ML scenario 930, training 913, deployment 914, metrics, and the like. These HTTP APIs can be consumed and orchestrated by the ML operations framework 920 to provide a simpler view to a non-ML expert on operating the side-by-side intelligent scenarios. The ML operations framework 920 can assume the connectivity between data intelligence platform 950 and the in-memory database 960 is established upfront with required authorization and a valid authentication. The ML operations framework 920 can be integrated into existing cloud lifecycle management tools 980 (e.g., Service Provider Cockpit (SPC) 981, Cloud Application Lifecycle Management (CALM) 982, Cloud Integration Automation Service (CIAS) 983, Readiness Framework (FW 984)) in order to reuse core capabilities instead of rebuilding them. The ML operations framework 920 can provide applications for creating of ML scenarios so that developers can register the ML scenarios 930 in the ML lifecycle framework 920 with the basic details. For a Predictive Analytics Library (PAL) and/or data intelligence 950 based applications, a high-level programming language class representing the ML scenario can be specified. The applications can be provided to enable the business administrators or domain experts to perform operations such as pre-requisite checks 911, training 913, deployment 915, activation, and/or monitoring 915 of the ML scenario for a specific business domain. The application can be built with more focus on non-ML expert expectations to operate ML scenarios 930. As described in FIGS. 7-8, the ML operations framework 920 can assist in establishing pre-requisite checks 911 for ML scenarios 930 which can be executed before setting up the ML application 970 in the system. The ML scenarios 930 can require the training data to be of sufficient quality and/or that a minimum volume of data is provided during training for optimizing the output of the ML scenario 930. In some cases, the ML scenarios 930 may mandate the configuration of a business process/scope item in the system upfront apart from data requisites. The ML operations framework 920 can facilitate execution of the qualification checks of ML scenarios 930 upfront and/or evaluate the results of the ML scenario 930 to decide the implementation. The business administrator 734 can select the registered ML scenario from the ML operations framework 920 and trigger the prerequisites checks with required parameters. The result can be providing decisive information about data quality, data volume, and configuration checks to the business administrators 724 to use the intelligent scenario 940 or perform any further changes required in the system. The ML operations framework 920 also captures the historic evaluations of prerequisites conditional checks of ML scenarios 940 to provide traceability and supportability. The pre-requisite checks 911 can be specific to a business domain and can be implemented by the ML scenario development teams during the ML application 970 development period. The pre-requisite checks 911 can be bounded to the ML scenario 930 registered in the ML operations framework 920.

For example, consider a finance-related table that requires more than 10000 records for an accurate result in the ML scenario inference calculation related to a finance scenario. The development of these checks align with the design established by the ML operations framework 920. A ML scenario 930 checks various conditions at the individual breakdown level in the system and produces a composite result to the business administrator 734 about the feasibility of using it. For an effective inference calculation of a business problem, the ML scenario 930 (for both embedded and side-by-side ML based) can be trained with the respective historical training dataset as described in FIG. 5A.

Figure 10:
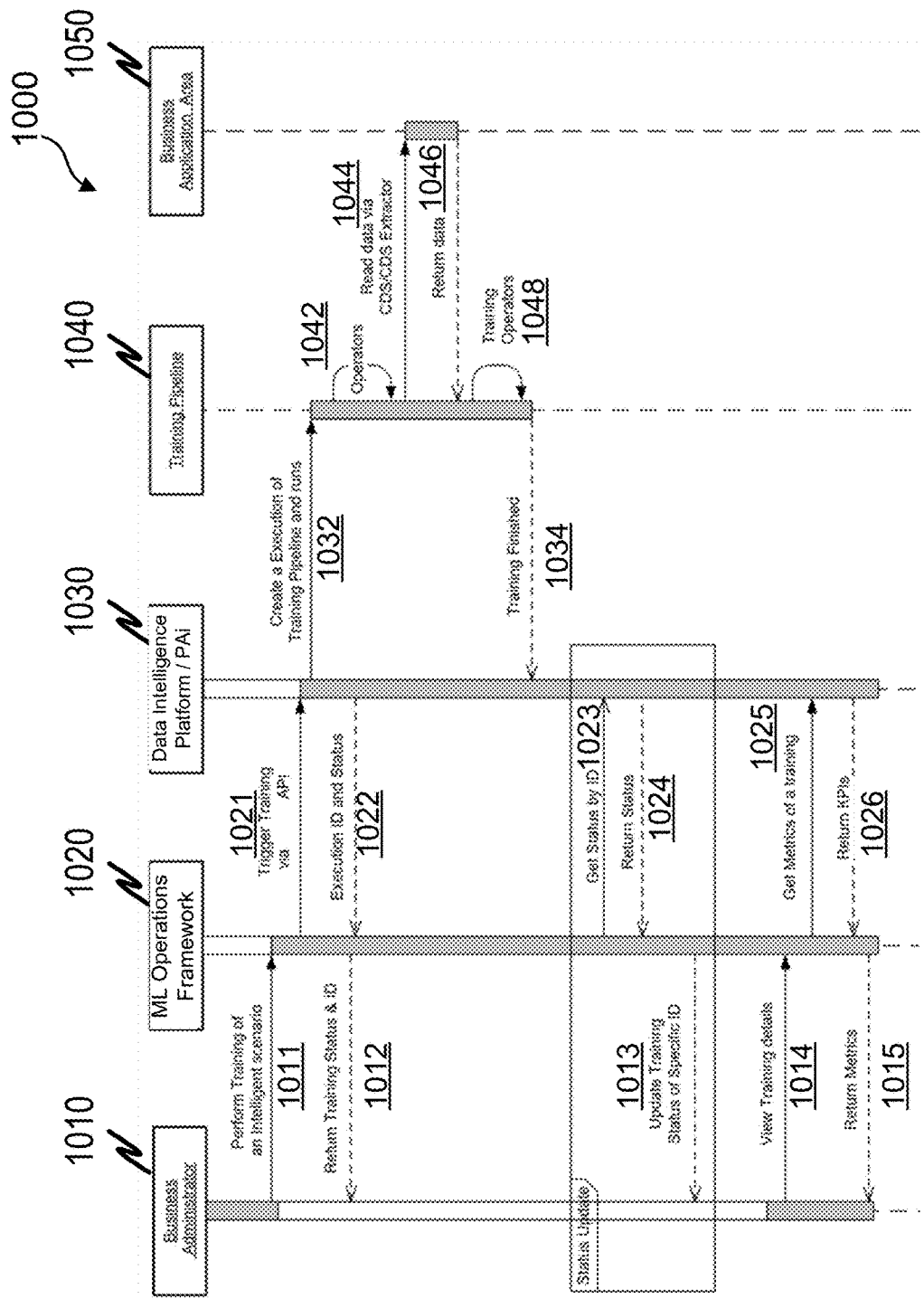
FIG. 10 illustrates an example sequence diagram depicting a training process for both a side-by-side ML architecture and an embedded ML architecture from a consumer point of view.

FIG. 10 illustrates an example sequence diagram 1000 depicting a training process for both a side-by-side ML architecture and an embedded ML architecture from a consumer point of view. The business administrator 1010 can trigger performance of a training session of an intelligent scenario, at s1011, in ML operations framework 1020 at any point in time as it does not impact the business applications. The ML operations framework 1020 triggers training via an API, at 1021. The data intelligence platform 1030 (e.g., for a side-by-side ML architecture) or a PAi 1030 (e.g., for an embedded ML architecture) creates an execution of a training pipeline 1040, at 1032. The training pipeline 1040 operates, at 1042, and reads data via core data services (CDS)/CDS extractor, at 1044. The business application 1050 returns the read data, at 1046. Using the returned data, the training pipeline 1040 trains operators, at 1048. Training pipeline notifies the data intelligence platform 1030 (e.g., for a side-by-side ML architecture) or a PAi 1030 (e.g., for an embedded ML architecture) once training is finished, at 1034. The data intelligence platform 1030 (e.g., for a side-by-side ML architecture) or a PAi 1030 (e.g., for an embedded ML architecture) provides an execution identification (ID) and status of the completed training to the ML operations framework 1020. The ML operations framework 1020 returns that status and ID back to the business administrator, at 1010.

In order to obtain status updates on the training, the ML operations framework sends a request for status by ID to the data intelligence platform 1030 (e.g., for a side-by-side ML architecture) or a PAi 1030 (e.g., for an embedded ML architecture), at 1023. The data intelligence platform 1030 (e.g., for a side-by-side ML architecture) or a PAi 1030 (e.g., for an embedded ML architecture) returns back its current status for that respective ID, at 1024, to the ML operations framework 1020. The ML operation framework 1020 then provides the business administrator 1010 with the updated training status of that specific.

After a training operation is completed, the business administrator 1010 can also view training details associated with the training (e.g., metrics, key influencers, and quality of the training process) by sending a request to the ML operations framework 1020, at 1014 can be provided to the business administrator 1010 for analysis and/or decision-making purposes.

The ML operations framework 1020 requests the metrics from the data intelligence platform 1030 (e.g., for a side-by-side ML architecture) or a PAi 1030 (e.g., for an embedded ML architecture) 1030, at 1025. In response, data intelligence platform 1030 (e.g., for a side-by-side ML architecture) or a PAi 1030 (e.g., for an embedded ML architecture) returns KPI associated with the training back to the ML operations framework 1020, at 1026. Those metrics are then returned back to the business administrator 1010, at 1015.

The business administrator 1010 can provide different parameters of the training activity as designed in the ML scenario and compare the trained model results. The ML operations framework 1020 can provide a comparative view to the business administrator 1010 of various training executions. The business administrator 1010 can decide on whether the trained model is ready to deploy. The ML operations framework 1020 can capture the parameters used in a training activity to templatize the training process. The ML operations framework 1020 can also provide additional functionality towards regular scheduling of training, notifications, asynchronous training executions, and the like. The ML operations framework 1020 can also support asynchronous training execution and monitoring to offset time intensive and/or resource consuming training activities in the side-by-side based ML scenarios.

The business administrator 1010 can use the trained models for inference calculation of a given dataset without disruptions. The ML operations framework 1020 can helps with a deployment and/or activation procedure of a ML application from the business administrator 1010 perspective. Deployment is the process of creating a running server instance out of the trained models (e.g., artifacts) from a training activity for the productive inference consumption. The business administrator 1010 can decide to deploy a trained model at any point in time in the ML framework without any impact on the business applications. An application can gain a higher advantage (e.g., abstraction of complexities) of changing the deployments in runtime based on the business administrator's analysis. Deployment of a ML application can be resource-intensive. The ML operations framework 1020 can enforce by default one active deployment of a trained model per client of a given ML scenario in the data intelligence platform. A ML scenario can have many trained models and many deployments, but only one active deployment per client. Based on the metrics, influencers, and quality of training models the business administrator 1010 can finalize a trained model for a deployment activity. The ML operations framework provides additional capability to test a deployment from the business application perspective and decide to activate a deployment for productive consumption.

Activation of a deployed ML application using the ML operations framework 1020 can allow the business administrators 1010 to perform successful testing of deployment and respective inference consumption in the business context. Based on the feasibility and accuracy of results, the business administrator 1010 can activate the deployment for the business user's consumption. The capability of activating the ML application using the ML operations framework 1020 can help to include the 'intelligence' in the business application with more control from the business administrator perspective. The active deployment of a ML scenario can be used by the ML operations framework 1020 to enforce the business applications to consume the inference as the ML operations framework 1020 can hide the complexity of active deployment to the applications. Additionally, a business administrator 1010 can decide to roll-back or actively deploy specific situations and conditions. The ML operations framework 1020 can also suggest performing retracting a trained model in the case of non-active and/or long-running instances of a trained model. The business administrator 1010 can consume the inference results and utilize the inference values in business logic intrinsically. The applications can consume the result (e.g., inference) of a side-by-side architecture by invoking an inference URL mapped to active deployment. The ML operations framework can enable the business administrator 1010 to continuously monitor the deployed trained models and the status of asynchronous training execution. The deployed trained model can be live in a data intelligence cluster. If it is not life, the deployed trained mode may break the inference consumption and disrupt the business users flow in business application. The ML operations framework 1020 can have a feature to check the existence of a deployed trained model continuously and notify the business administrator in case of failures. The ML operations framework 1020 can continuously monitor the training execution and update the business administrator on regular intervals. The ML operations framework 1020 can also provide advanced monitoring towards the degradation of deployed trained model and inference consumption.

Figure 11:
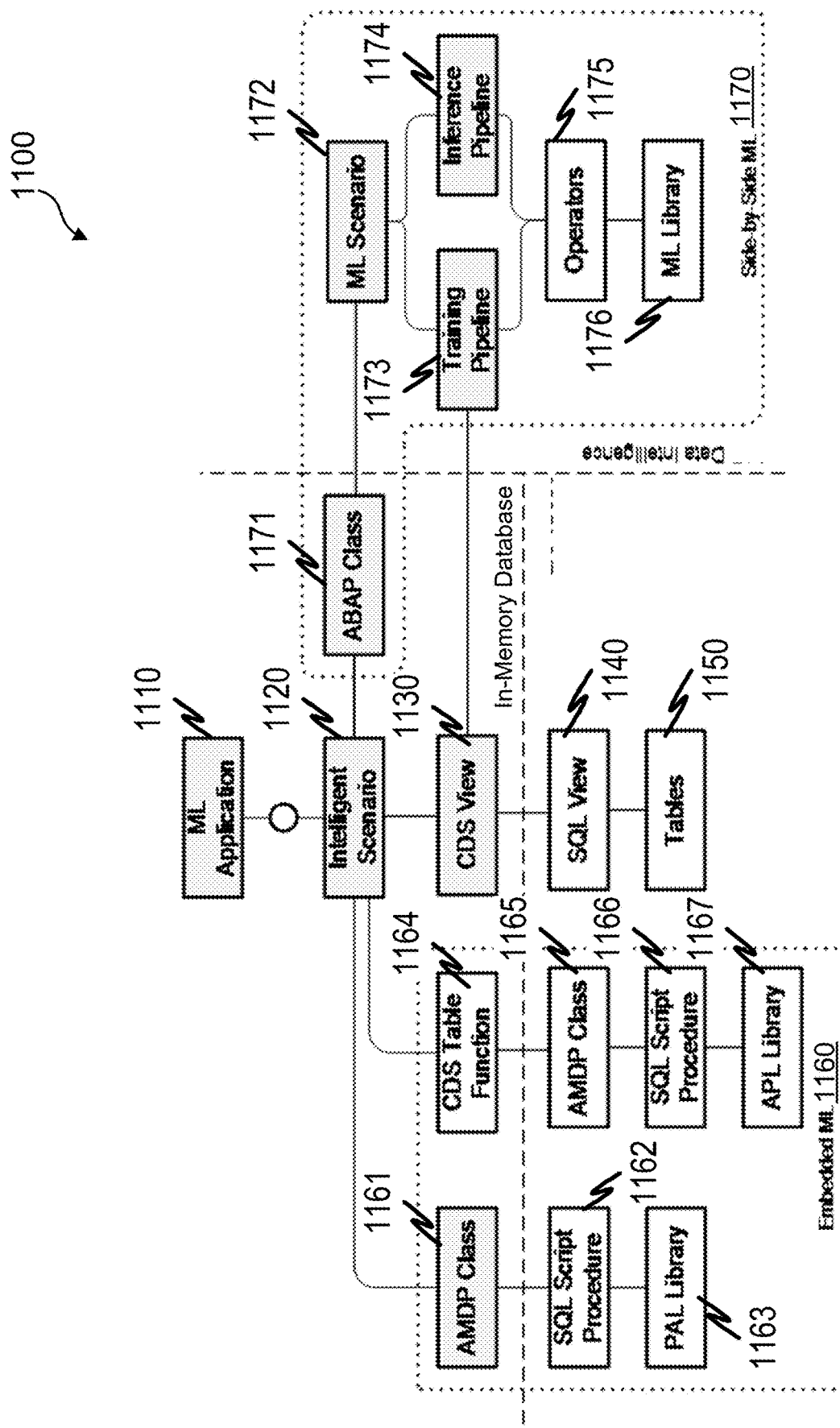
FIG. 11 illustrates an example software architecture of ML lifecycle management from a provider point of view.

FIG. 11 illustrates an example software architecture 1100 of ML lifecycle management from a provider point of view for both an embedded ML architecture and a side-by-side ML architecture. A provider generates and provides the following aspects to a consumer when interacting with either an embedded ML architecture 1160 or a side-by-side ML architecture 1170: the ML application 1120, an intelligent scenario 1120, a high-level programming language (ABAP) class 1171, a ML scenario 1172, a training pipeline 1173, an inference timeline 1174, a CDS view 1130, and a high-level programming language managed database procedure (AMDP) class 1161. The ML application 1110 can integrate the ML capability into the business processes and the according user interfaces. Intelligent scenario 1120 provides the link among development artifacts that are required for the ML application 1110 and can be used to handle lifecycle management aspects. The intelligent scenario 1120 is the independent of whether an embedded ML architecture 1160 or side-by-side ML architecture 1170. The CDS view 1130 can be defined to enable reading the application data for model training. The SQL view 1140 can be generated on top of the application tables during the activation phase. SQL requests can be pushed down from high-level programming language class 1171 to the SQL view 1140 to achieve optimal performance.

An embedded ML architecture 1160 can include an AMDP class 1161, SQL script procedures 1162, 1166, a PAL library 1163, a CDS table function 1164, an AMDP class 1165, and an APL library 1167. Two libraries can be used an embedded ML architecture 1160: APL library 1167 and PAL library 1163. The APL library 1167 is a smart library that generates artifacts on its own. APL library may have a limited number of algorithms and may not be sufficient for a large number of use cases. Training pipeline having various training logic as well as a consumption pipeline is required when a PAL library 1163 is utilized. For embedded ML scenarios based on the PAL library 1163, an AMDP class 1161 is provided by the provider. The AMDP class can contain the training and/or inference method implemented in SQL script procedure 1162 in order to cover the necessary ML logic. PAL can be used for breakout scenarios where specific data validations, transformations, or feature reductions are required. The AMDP class 1161 can be based on an interface and is in the ownership of the provider (e.g., developer) so that complex logic can be implemented.

For side-by-side ML based on a data intelligence platform, a training pipeline 1173 and an inference pipeline 1174 can be provided by the provider (e.g. developer), which cover the necessary ML logic. The training pipeline and the inference pipeline can be modelled graphically based on operators for transformation, validation, or incorporation of algorithms. ML scenario 1172 can be the link amongst the development artifacts of data intelligence platform to resolve lifecycle management. The training pipeline 1173 (e.g., defines training logic such as what data transformations and/or various algorithms needed to execute the ML scenario) are needed and the inference pipeline 1174 (e.g., defines logic for transformations associated with an inference generated by the ML scenario) can be exposed by application services to the in-memory database platform. The ABAP class 1171 wraps those application services, making then them consumable by ABAP methods.

Figure 12:
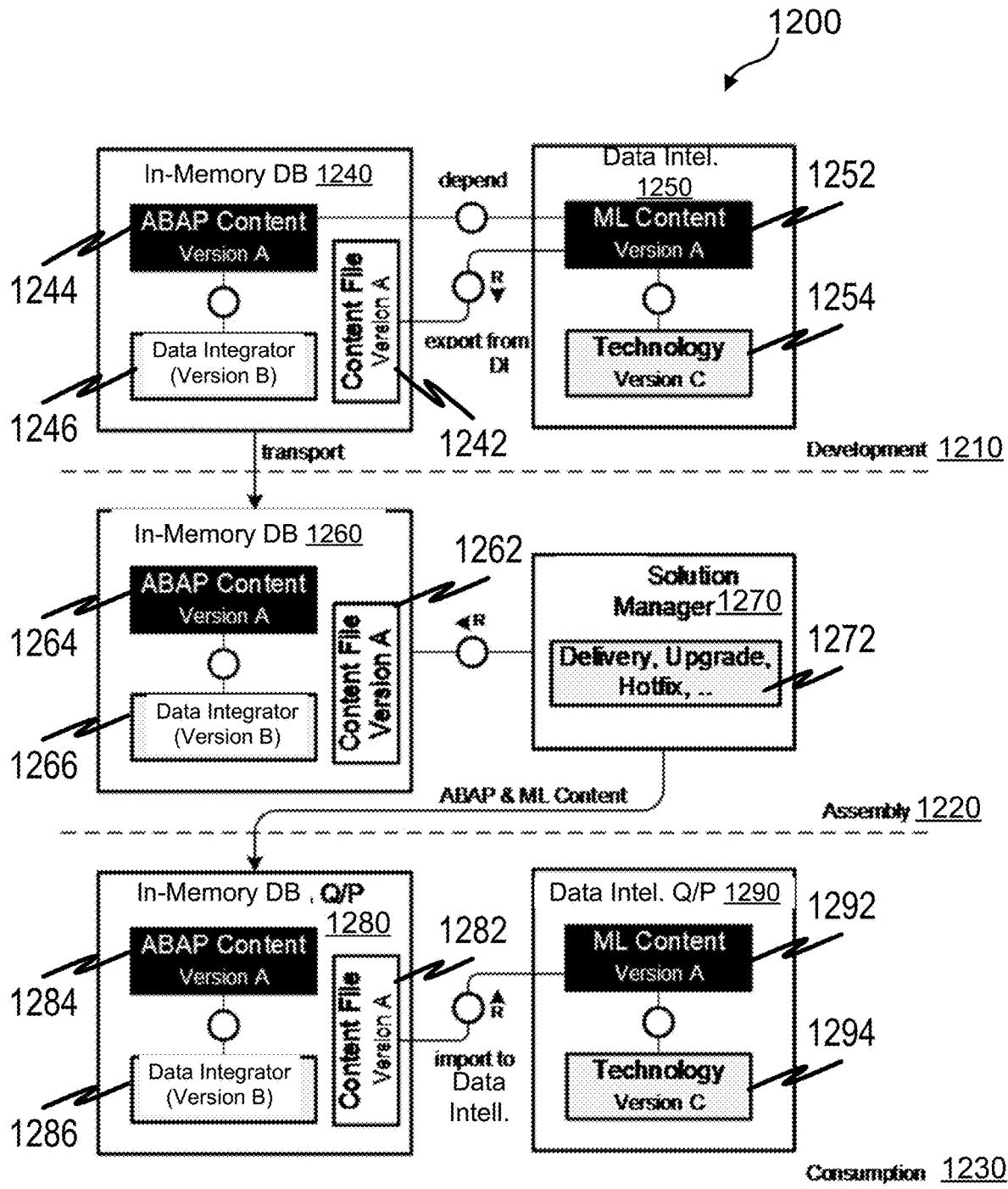
FIG. 12 illustrates an example system diagram implementing the software architecture of FIG. 11.

FIG. 12 illustrates an example system diagram 1200 implementing the software architecture 1100 of FIG. 11. Software architecture 1200 delivers the data intelligence content as part of the ABAP content and publishes it from the in-memory stack to a data intelligence platform in a customer system landscape. Related artifacts are deployed together with an adequate version (e.g., Version A, Version B, Version C). With that down-times can be avoided and consistent lifecycle processes can be achieved.

In considering the side-by-side architecture of FIG. 12, the ABAP content 1244 and ML content 1252 are dependent upon one another and should be kept in in sync. The ABAP content 1244 includes the following artifacts: ML application 1110, intelligent scenario 1120, CDS view 1130, and the ABAP class 1161. The ML content 1252 includes the following artifacts: training pipeline 1173, inference pipeline 1174, and ML scenario 1172. The artifacts included within the ABAP content 1244 and ML content 1252 can be deployed simultaneously and consistently on in-memory database 1240, and data intelligence platform 1250 to make the ML use case work. In general, the ABAP content 1244 and the ML content 1250 having the same version are compatible with each other. If the versions are not the same between the ABAP content 1244 and the ML content 1250, the versions should be those which are compatible with each other. Due to continuous development of new versions of the ABAP content 1244 and the ML content 1252 can be provided and/or deployed on consumer systems. If, for example, a software bug exist in the ML application and it must be corrected within the ABAP content 1244 and the ML content 1252, the correction can be delivered for the effected version and deployed simultaneously using the system in FIG. 12 and the software architecture of FIG. 11.

During the development phase 1210, for the ML applications, the ABAP and data intelligence content are implemented consistently for a specific in-memory database 1240 product version noted in the content file 1242 (e.g., Version A). The ML content 1252 from the data intelligence platform 1250 can be exported from data intelligence infrastructure 1250 and imported to in-memory database 1240 as a file for coupling with the ABAP content 1244. The consistency between the ML content 1252 and the ABAP content 1244 can ensure reliable lifecycle processes and avoid downtimes. The content file 1242 contains metadata relating to the minimal data intelligence version that is required to process the ML content 1252 (e.g., Version A). The new in-memory database 1240 product version of the ABAP content (e.g., Version A) results in a new data intelligence 1250 content version (e.g., Version A). Corrections can be developed for the effected in-memory database 1240 content version (e.g., ABAP content 1244) and a data intelligence content versions (e.g., ML content 1252) and maintained for new development. The data integrator component 1246 can be a technology platform that allows organizations to integrate data, business processes, and/or elements from a variety of sources into unified environment.

During the assembly phase 1220, the ABAP content 1244 and ML content 1252 as part of the in-memory database 1260 can be transported to assembly system (e.g., in-memory database 1260) and packaged to a specific in-memory database product version (e.g., Version A). The transported ABAP content 1244 and ML content 1252 can include corrections. New versions of this content can be provisioned by solution manager 1270 to consumers. Solution manager 1270 can also delivery, upgrade, and/or correct the ML scenario (e.g., 1272). The data integrator component 1266 can be a technology platform that allows organizations to integrate data, business processes, and/or elements from a variety of sources into unified environment.

During the consumption phase 1230, the in-memory database quality system (Q/P) 1280 belong to the consumer can be supplied with the ABAP content 1284 and ML content 1292 by the solution manager 1270. The ML content 1292 can be published and/or imported from the in-memory database Q/P 1280 to the data intelligence Q/P 1290. Data integrator 1286 technology upgrades can be processed upfront and the required minimal data intelligence technology version can be checked during content publishing. Changes made by the consumer can be transported from in-memory database Q/P 1280 to a productive system (not shown) and published to a data intelligence productive system (not shown).

Figure 13:
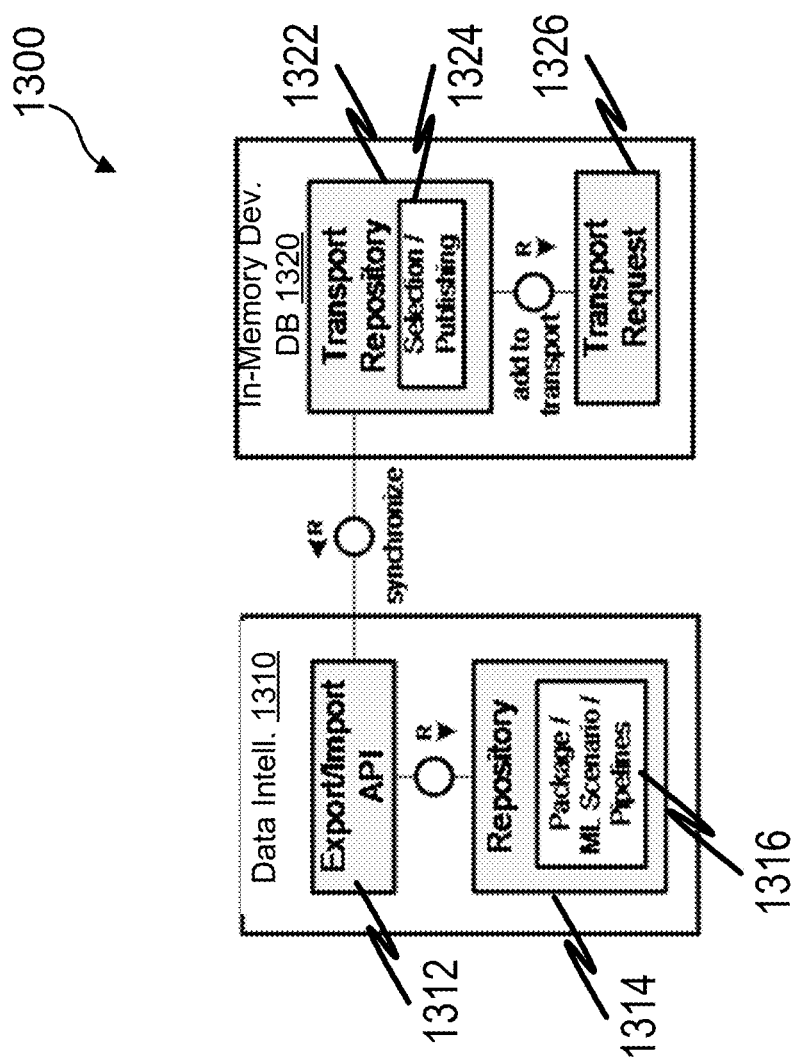
FIG. 13 illustrates an example system architecture for generating an application package and publishing content to a consumer, from the provider point of view.

FIG. 13 illustrates an example system architecture 1300 for generating an application package and publishing content to a consumer, from the provider point of view. Within the data intelligence platform 1320, the development artifacts (e.g., ML scenarios and pipelines) can be created and structured into application package 1316 (e.g., Finance, Human Resources). The application package can be stored within a repository 1314 of the data intelligence platform 1310. Within the in-memory database 1320, a transport repository 1320 can synchronize with an export/import API of the data intelligence platform 1310 for selection and publishing of ML content. The provider of the ML application can select the relevant ML content and add it to the transport request 1326. Such request also contains the ABAP content previously described in FIGS. 11-12. This request can be deployed on consumer's in-memory database system from where the corresponding ML content is published 1324, using the transport repository 1322 to customer's data intelligence platform. The ABAP content and ML content can be handled consistently and simultaneously so that development artifacts are available to use the ML application.

Figure 14:
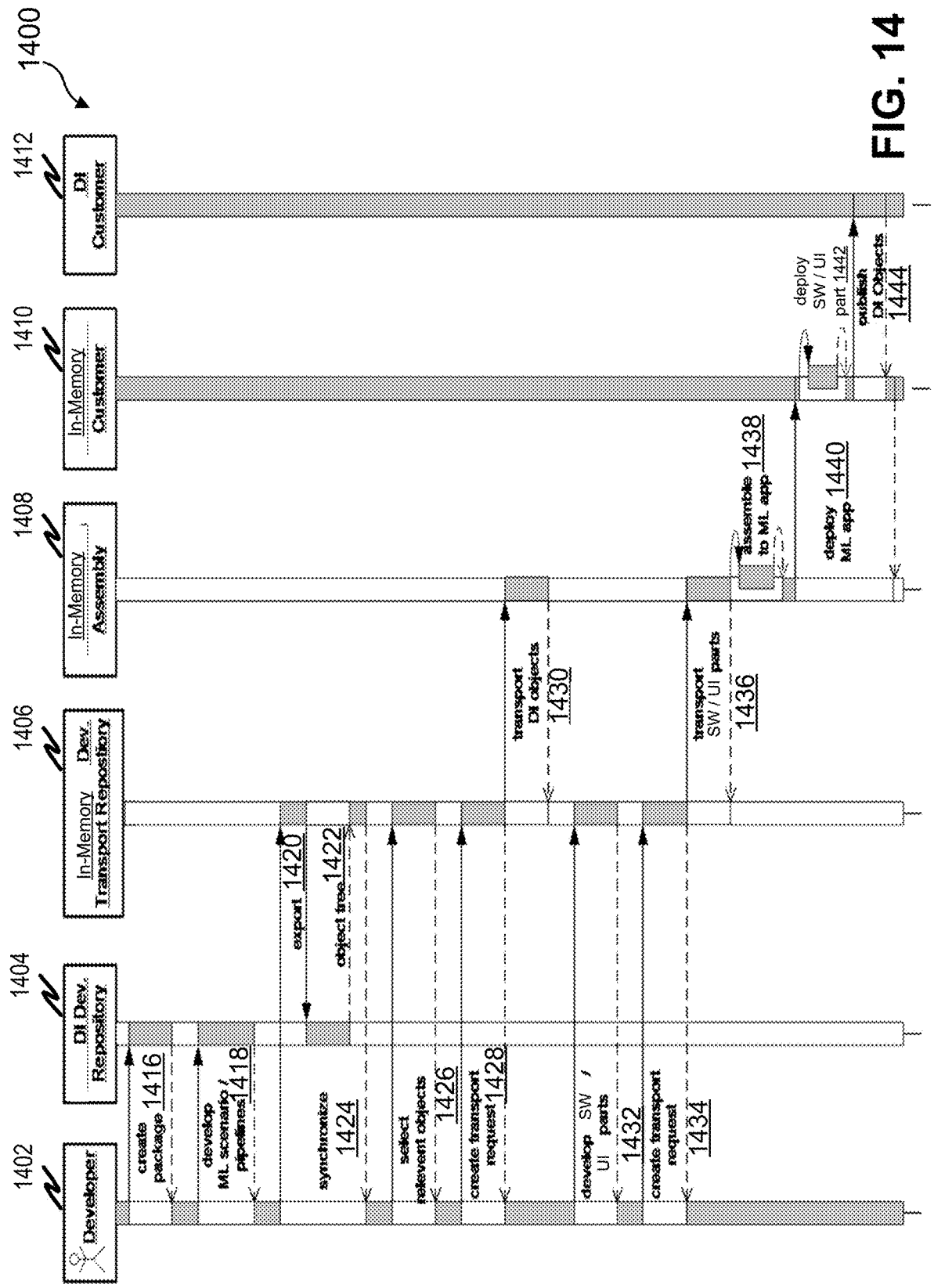
FIG. 14 illustrates a sequence diagram of the process from ML content creation to publishing the content within a consumer's data intelligence platform.

FIG. 14 illustrates a sequence diagram 1400 of the process from ML content creation to publishing the content within a consumer's data intelligence platform. A developer 1402 can create a package, at 1416, containing ML artifacts and transmit that to a data intelligence development repository 1404. The developer 1402 can also select ML scenarios, training pipelines, and/or intelligence pipelines, at 1418, and provide those to the data intelligence development repository 1404. Such selections are specific to a particular use case for a ML scenario. These ML scenarios and pipelines can be exported, at 1420, to the in-memory development transport repository 1406. The data intelligence platform development repository 1404 can provide an object tree, at 1422, to the in-memory development transport repository 1406. Synchronization can occur, at 1424, between the in-memory development transport repository 1406 and the developer 1402. The developer 1402 can select relevant objects, at 1426, and create a transport request, at 1428, which includes such objects. The developer 1402 can provide this request to the in-memory development transport repository 1406 which in transports the data intelligence objects, at 1430, to in-memory assembly 1408. Similarly, the developer 1402 can develop various software and/or UI components, at 1432, and create a transport request, at 1434, to transport same to the in-memory development transport repository 1406. Having both the selected relevant objects and the developed software and/or UI components, the in-memory assembly 1408 can assemble these into a ML application, at 1438. The in-memory assembly can deploy the ML application, at 1440, to an in-memory customer 1410. The in-memory customer 1410 can determine when to deploy the ML scenarios contained within the application, at 1442, and a data intelligence customer 1424 can publish the data intelligence objects, at 1444.

Figure 15:
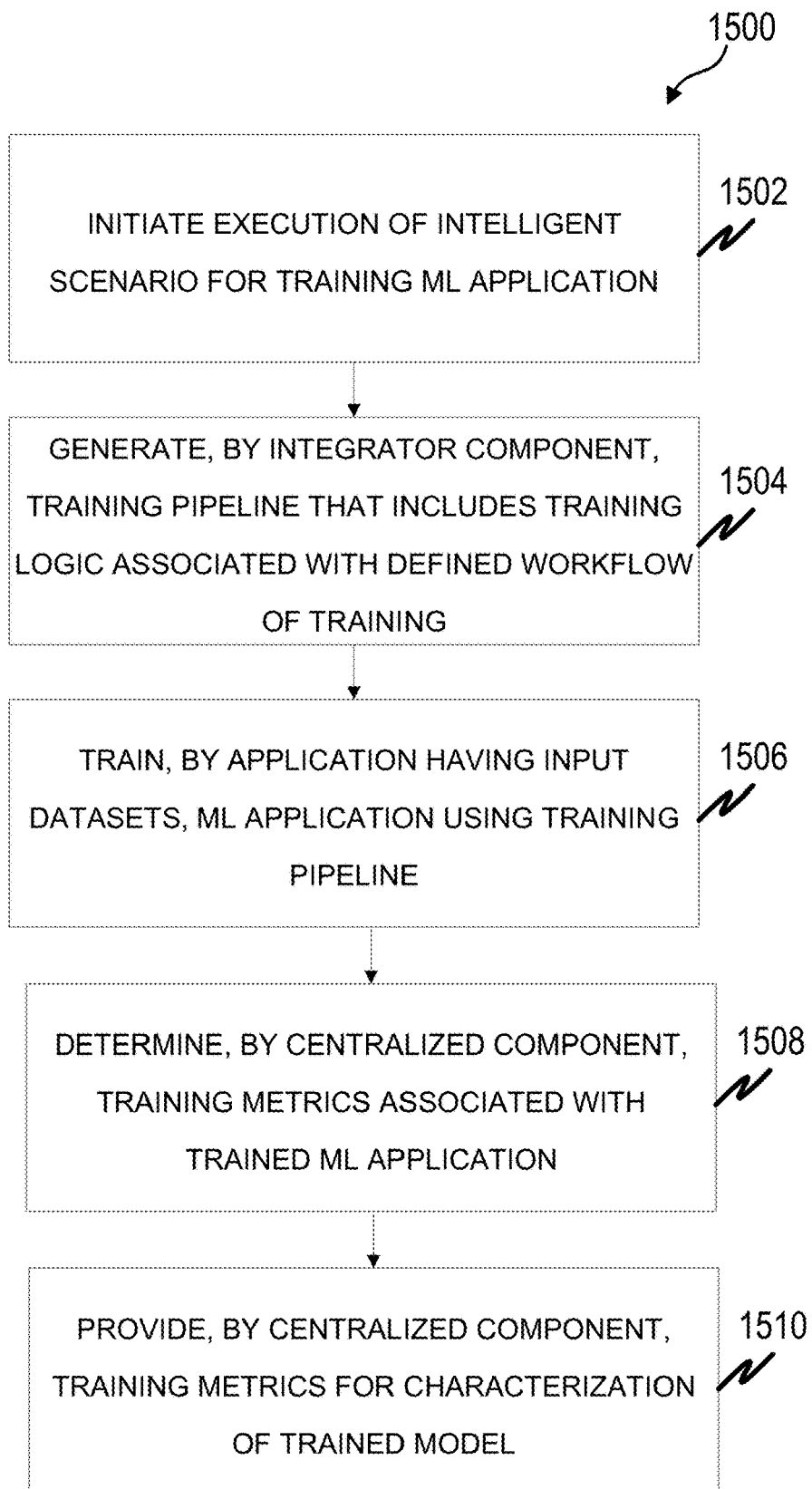
FIG. 15 is an example process flow chart for ML lifecycle management from a provider view.

FIG. 15 is an example process flow chart 1500 for managing a lifecycle of a ML application from a consumer point of view. Execution of an intelligent scenario for training of the ML application is initiated, at 1502. An integrator component generates, at 1504, a training pipeline. The training pipeline includes training logic associated with a defined workflow of the training. An application having an input dataset trains, at 1506, the ML application using the training pipeline. An integrator component determines, at 1508, training metrics associated with the trained ML application. The training metrics are indicators of a level of accuracy of the trained ML application. A centralized component provides, at 1510, the training metrics for characterization of the trained model.

Figure 16:
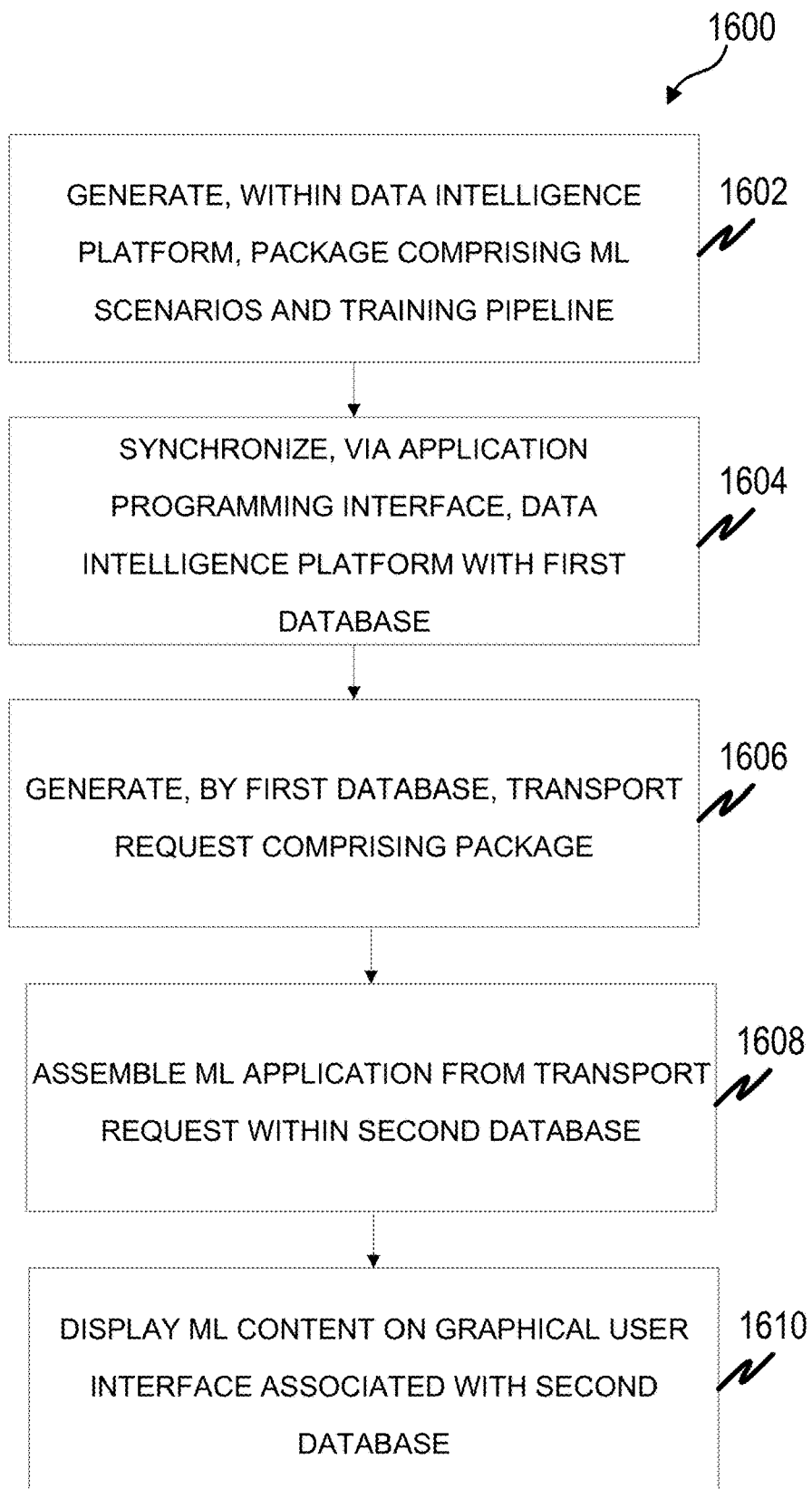
FIG. 16 is an example process flow chart for ML lifecycle management from a consumer view for both a side-by-side architecture and embedded ML architecture.

FIG. 16 is an example process flow chart 1600 for managing a lifecycle of a ML application from a provider point of view. A data intelligence platform generates, at 1602, a package comprising a ML scenarios and a training pipeline. The training pipeline includes training logic associated with a defined workflow for training the ML application. An API synchronizes, at 1604, the data intelligence platform with a first database (e.g., in-memory development database 1406). The first database generates, at 1606, a transport request having the package. The transport request facilitates publication of content from the ML application. The ML application is assembled, at 1608, from the transport request within a second database (e.g., in-memory database assembly 1408). ML content is displayed, at 1610, on a graphical user interface associated with the second database.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random access memory associated with one or more physical processor cores.

Figure 17:
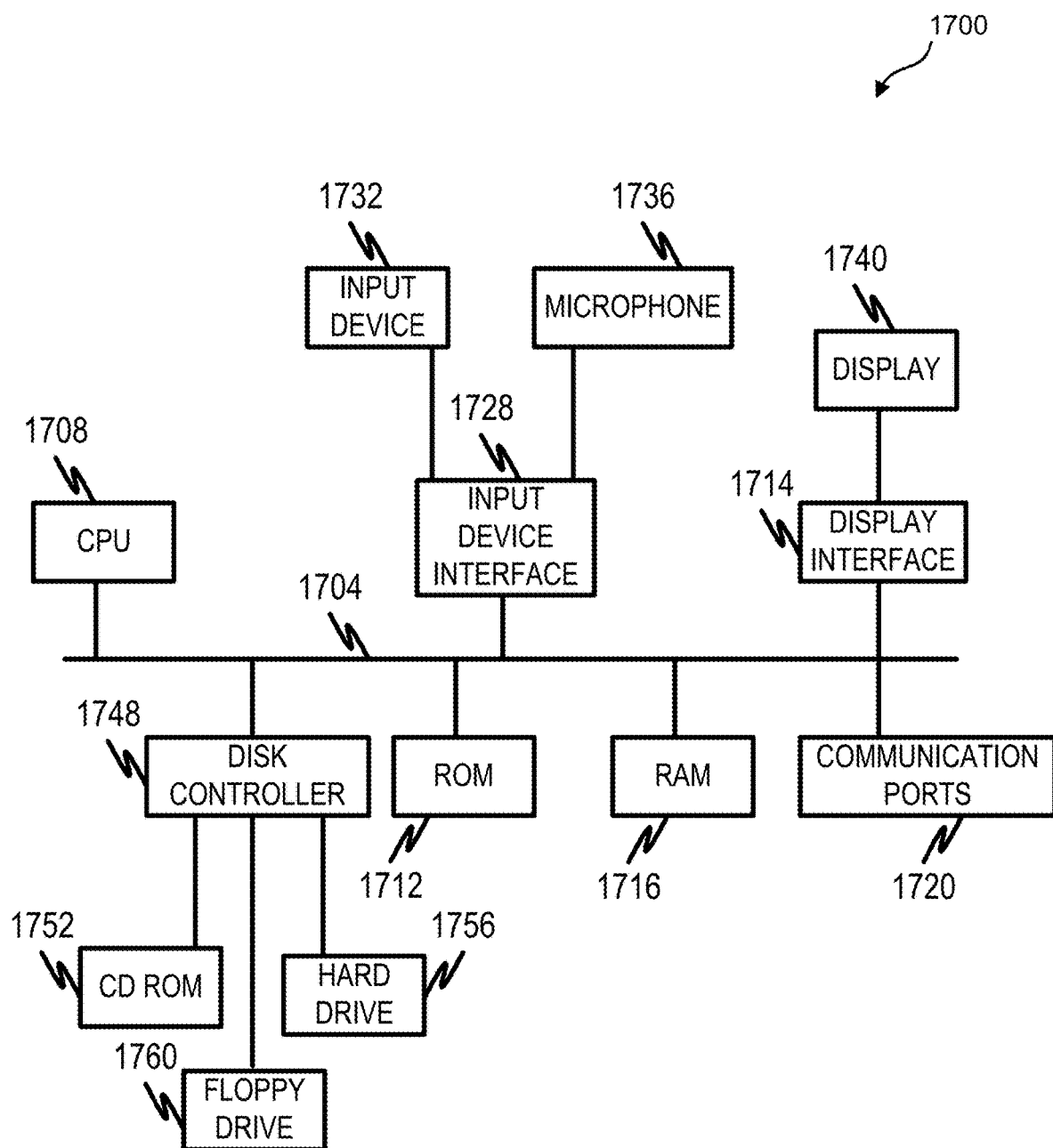
FIG. 17 is a diagram illustrating a sample computing device architecture for implementing various aspects described herein.

FIG. 17 is a diagram 1700 illustrating a sample computing device architecture for implementing various aspects described herein. A bus 1704 can serve as the information highway interconnecting the other illustrated components of the hardware. A processing system 1708 labeled CPU (central processing unit) (e.g., one or more computer processors/data processors at a given computer or at multiple computers), can perform calculations and logic operations required to execute a program. A non-transitory processor-readable storage medium, such as read only memory (ROM) 1712 and random access memory (RAM) 1716, can be in communication with the processing system 1708 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 1748 can interface one or more optional disk drives to the system bus 1704. These disk drives can be external or internal floppy disk drives such as 1760, external or internal CD-ROM, CD-R, CD-RW or DVD, or solid state drives such as 1752, or external or internal hard drives 1756. As indicated previously, these various disk drives 1752, 1756, 1760 and disk controllers are optional devices. The system bus 1704 can also include at least one communication port 1620 to allow for communication with external devices either physically connected to the computing system or available externally through a wired or wireless network. In some cases, the communication port 1720 includes or otherwise comprises a network interface.

To provide for interaction with a user, the subject matter described herein can be implemented on a computing device having a display device 1740 (e.g., a CRT (cathode ray tube) or LCD (liquid crystal display) monitor) for displaying information obtained from the bus 1704 to the user and an input device 1732 such as keyboard and/or a pointing device (e.g., a mouse or a trackball) and/or a touchscreen by which the user can provide input to the computer. Other kinds of input devices 1732 can be used to provide for interaction with a user as well; for example, feedback provided to the user can be any form of sensory feedback (e.g., visual feedback, auditory feedback by way of a microphone 1736, or tactile feedback); and input from the user can be received in any form, including acoustic, speech, or tactile input. In the input device 1732 and the microphone 1736 can be coupled to and convey information via the bus 1704 by way of an input device interface 1728. Other computing devices, such as dedicated servers, can omit one or more of the display 1740 and display interface 1714, the input device 1732, the microphone 1736, and input device interface 1728.

To provide for interaction with a user, the subject matter described herein can be implemented on a computer having a display device (e.g., a CRT (cathode ray tube) or LCD (liquid crystal display) monitor) for displaying information to the user and a keyboard and a pointing device (e.g., a mouse or a trackball) and/or a touchscreen by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for managing a lifecycle of a machine learning (ML) application from a consumer point of view, the method implemented by one or more data processors forming part of at least one computing device and comprising:
   initiating execution of an intelligent scenario for training of the ML application;
   generating, by an integrator component, a training pipeline, wherein the training pipeline comprises training logic associated with a defined workflow for the training;
   training, with an input dataset comprising a view of application data, the ML application using the training pipeline;
   exposing an inference pipeline by application services, wherein the inference pipeline defines logic for transformations associated with an inference generated by the ML application;
   determining, by the integrator component, training metrics associated with the trained ML application, wherein the training metrics are indicators of a level of accuracy of the trained ML application; and
   providing, by a centralized component, the training metrics for characterization of the trained ML application.

2. The method of claim 1, further comprising:
   triggering, by the centralized component, training via an application programming interface; and
   providing, by the integrator component, a training status and a training identification associated with the training.

3. The method of claim 2, further comprising determining a status of the training by:
   requesting, by the centralized component, a status update using the training identification;
   returning, by the integrator component, updated status associated with the requested status update; and
   updating, by the centralized component, training status with the returned updated status.

4. The method of claim 1, wherein the ML application is created using a side-by-side ML architecture and the training pipeline is generated by a data intelligence platform.

5. The method of claim 1, wherein the ML application is created using an embedded ML architecture and the training pipeline is generated by a predictive analytics integrator (PAi).

6. The method of claim 5, wherein the embedded ML architecture is an in-memory database system.

7. The method of claim 1, further comprising receiving, by the training pipeline, the input data set for the training, wherein the ML application is trained using the input dataset.

8. A system for managing a lifecycle of a machine learning (ML) application from a consumer point of view, the system comprising:
one or more data processors; and
memory storing instructions stored on at least one of the one or more data processors, which when executed, result in operations comprising:
initiating execution of an intelligent scenario for training of the ML application;
generating, by an integrator component, a training pipeline, wherein the training pipeline comprises training, with an input dataset comprising a view of application data, the ML application using the training pipeline;
exposing an inference pipeline by applications services, wherein the inference pipeline defines logic for transformations associated with an inference generated by the ML application;
integrating an inference API having a signature defined during design time as part of the intelligent scenario;
determining, by the integrator component, training metrics associated with the trained ML application, wherein the training metrics are indicators of a level of accuracy of the trained ML application; and
providing, by a centralized component, the training metrics for characterization of the trained ML application.

9. The system of claim 8, wherein the operations further comprise:
triggering, by the centralized component, training via an application programming interface; and
providing, by the integrator component, a training status and a training identification associated with the training.

10. The system of claim 9, wherein the operations further comprise determining a status of the training by:
requesting, by the centralized component, a status update using the training identification;
returning, by the integrator component, updated status associated with the requested status update; and
updating, by the centralized component, training status with the returned updated status.

11. The system of claim 9, wherein the ML application is created using a side-by-side ML architecture and the training pipeline is generated by a data intelligence platform.

12. The system of claim 9, wherein the ML application is created using an embedded ML architecture and the training pipeline is generated by a predictive analytics integrator (PAi).

13. The system of claim 12, wherein the embedded ML architecture is an in-memory database system.

14. The system of claim 9, wherein the operations further comprise receiving, by the training pipeline, the input data set for the training, wherein the ML application is trained using the input dataset.

15. A non-transitory computer program product storing instructions which, when executed by at least one data processor forming part of at least one computing device, implement operations comprising:
initiating execution of an intelligent scenario for training of a machine learning (ML) application;
triggering, by a centralized component, training via an application programming interface;
generating, by an integrator component, a training pipeline, wherein the training pipeline comprises training logic associated with a defined workflow for the training;
exposing an inference pipeline by applications services, wherein the inference pipeline defines logic for transformations associated with an inference generated by the ML application;
training, by an application having an input dataset, the ML application using the training pipeline;
providing, by the integrator component, a training status and a training identification associated with the training;
determining, by the integrator component, training metrics associated with the trained ML application, wherein the training metrics are indicators of a level of accuracy of the trained ML application; and
providing, by the centralized component, the training metrics for characterization of the trained ML application.

16. The non-transitory computer program product of claim 15, further comprising determining a status of the training by:
requesting, by the centralized component, a status update using the training identification;
returning, by the integrator component, updated status associated with the requested status update; and
updating, by the centralized component, training status with the returned updated status.

17. The non-transitory computer program product of claim 15, wherein the ML application is created using a side-by-side ML architecture and the training pipeline is generated by a data intelligence platform.

18. The non-transitory computer program product of claim 15, wherein the ML application is created using an embedded ML architecture and the training pipeline is generated by a predictive analytics integrator (PAi).

19. The non-transitory computer program product of claim 18, wherein the embedded ML architecture is an in-memory database system.

* * * * *